(12) United States Patent
Fujimoto et al.

(10) Patent No.: US 6,952,289 B1
(45) Date of Patent: Oct. 4, 2005

(54) INTEGRATED IMAGE READING/WRITING HEAD, AND IMAGE PROCESSING APPARATUS INCORPORATING THE SAME

(75) Inventors: Hisayoshi Fujimoto, Kyoto (JP); Hiroaki Onishi, Kyoto (JP); Toshihiko Takakura, Kyoto (JP); Norihiro Imamura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/744,746

(22) PCT Filed: Jul. 30, 1999

(86) PCT No.: PCT/JP99/04143

§ 371 (c)(1),
(2), (4) Date: Jan. 29, 2001

(87) PCT Pub. No.: WO00/07358

PCT Pub. Date: Feb. 10, 2000

(30) Foreign Application Priority Data

Jul. 31, 1998 (JP) .................................. 10-218092

(51) Int. Cl.[7] .......................... H04N 1/024; H04N 1/04; B41J 27/00
(52) U.S. Cl. ...................... 358/472; 358/482; 358/483; 358/496; 358/474; 358/296; 250/208.1; 347/256; 347/257; 347/263; 347/241; 347/242
(58) Field of Search ............................... 358/472, 473, 358/474, 483, 496, 498, 401, 501, 512–514, 358/296, 482, 471; 250/208.1, 239, 216, 250/227.2; 347/256, 241; 257/678, 680, 257/431–434, 724–730; 399/144, 211; 382/312, 382/318

(56) References Cited

U.S. PATENT DOCUMENTS

| 5,570,122 A | * | 10/1996 | Imamura et al. ............ 347/171 |
| 5,579,114 A | * | 11/1996 | Imamura .................... 358/482 |
| 5,780,840 A | * | 7/1998 | Lee et al. ................ 250/208.1 |
| 5,859,421 A | * | 1/1999 | Onishi et al. ............ 250/208.1 |
| 6,014,231 A | * | 1/2000 | Sawase et al. .............. 358/482 |
| 6,166,832 A | * | 12/2000 | Fujimoto .................... 358/484 |
| 6,222,581 B1 | * | 4/2001 | Fujimoto et al. ........... 347/256 |
| 6,295,141 B1 | * | 9/2001 | Ogura et al. ................ 358/475 |
| 6,448,995 B1 | * | 9/2002 | Fujimoto et al. ........... 347/241 |
| 6,469,808 B1 | * | 10/2002 | Onishi et al. ............... 358/475 |

FOREIGN PATENT DOCUMENTS

| JP | 6-070090 | 3/1994 | .......... H04N 1/024 |
| JP | 6-086004 | 3/1994 | .......... H04N 1/024 |
| JP | 6-113069 | 4/1994 | .......... H04N 1/024 |
| JP | 9-284470 | 10/1997 | .......... H04N 1/024 |
| JP | 10-051587 | 2/1998 | .......... H04N 1/024 |
| WO | WO 98 05158 A | 2/1998 | .......... H04N 1/024 |

* cited by examiner

Primary Examiner—Cheukfan Lee
(74) Attorney, Agent, or Firm—Michael Bednarek; Pillsbury Winthrop Shaw Pittman LLP

(57) ABSTRACT

The integrated image reading/writing head (X) includes a substrate (4) having a surface (40) provided with a reading circuit including a plurality of light receiving elements (20), a plurality of printing elements (60) and a writing circuit for controlling the printing elements (60). The substrate (4) is fitted with a connector (8) for electrical wiring. The connector (8) is electrically connected with each of the reading circuit, the printing elements and the writing circuit.

14 Claims, 17 Drawing Sheets

INTEGRATED IMAGE READING/WRITING HEAD, AND IMAGE PROCESSING APPARATUS INCORPORATING THE SAME

TECHNICAL FIELD

The present invention relates to an integrated image reading/writing head having both image reading capability and image forming capability, and an image processing apparatus incorporating the same.

BACKGROUND ART

A facsimile machine is an example of an image processing apparatus. The facsimile machine has to have both image reading capability and image printing capability, and further has to be as small as possible.

With this background, there is already an integrated image reading/writing head Y as shown in FIG. 16. The integrated image reading/writing head Y comprises a case 1 having an upper surface portion fitted with a transparent cover 19. Inside the case 1, a light source 3 for illuminating a reading line L provided on the transparent cover 19 and a lens 5 are provided. The case 1 has a bottom surface portion mounted with a substrate 4. The substrate 4A has an upper surface 40 and a back surface 41 respectively mounted with a plurality of sensor IC chips 2 each incorporating a plurality of light receiving elements 20 and a plurality of heating elements 60, linearly and longitudinally of the substrate 4. Further, the back surface 41 of the substrate 4 is also mounted with a plurality of drive IC chips 6 as part of a drive circuit for drive control of the heating elements 60.

As shown in FIG. 17, the substrate is provided with two connectors 8A, 8B for electrical connection with unillustrated external components. The connector 8A is electrically connected with the sensor IC chips 2 via a wiring pattern (not illustrated) formed in the upper surface 40 of the substrate 4. The connector 8B is electrically connected with the heating elements 60 and the drive IC chips 6 via a wiring pattern (not illustrated) formed in the back surface 41 of the substrate 4.

According to the integrated image reading/writing head Y constituted as above, as shown in FIG. 16, a document D is contacted onto the transparent cover 19 and fed by a platen roller $P_1$. During this feeding process, a surface of the document D is illuminated by light from the light source 3. Light reflected by the surface of the document D is focused by a lens 5, forming an image of the document D on the array of the light receiving elements 80. Each of the light receiving elements 80 outputs read image data line by line. This output signal is taken out via the connector 8A. On the other hand, a thermosensible recording paper K is contacted onto each of the heating elements 60 and fed by a platen roller $P_2$. During this feeding process, the drive circuit constituted by the drive IC chips 6 selectively drives the heating elements 60 based on data sent from outside via the connector 8B, thereby printing an image on the recording paper K line by line. If the integrated image reading/writing head Y of the above constitution is used, the facsimile machine can be made thinner than in the case where the reading head and the writing head are separated from each other.

However, the above facsimile machine has the following problems.

First, the two platen rollers $P_1$, $P_2$ are disposed so as to sandwich the whole of the integrated image reading/writing head Y. Thus, the entire assembly of the integrated image reading/writing head Y and the two platen rollers $P_1$, $P_2$ has a large dimension thickness-wise of the integrated image reading/writing head Y. Therefore, the thickness of the facsimile machine as a whole is still large.

Second, when manufacturing the integrated image reading/writing head Y, first, the sensor IC chips 2 must be mounted on the upper surface 40 of the substrate 4, and then the substrate 4 must be turned over in order to mount the heating elements 60 and the drive IC chips 6 on the back surface 41 of the substrate 4e. Further, wiring patterns relevant to these must be formed respectively in the upper surface 40 and the back surface 41 of the substrate 4. Therefore, productivity in the manufacture of the integrated image reading/writing head Y is low.

Third, there are many connectors, since the substrate 4 is provided with two connectors 8A, 8B. Therefore, productivity in the manufacture of the integrated image reading/writing head Y becomes even lower.

DISCLOSURE OF THE INVENTION

It is therefore an object of the present invention to provide an integrated image reading/writing head and an image processing apparatus capable of solving the problems described above.

An integrated image reading/writing head provided by a first aspect of the present invention comprises:

a substrate provided with a reading circuit including a plurality of light receiving elements disposed in a row, a case assembled to the substrate and enclosing the light receiving elements;

a transparent cover attached to the case, spaced from and opposed to the substrate and to be tightly contacted by a document being fed;

a light source disposed within the case for illuminating the document;

a plurality of lenses disposed within the case for focusing an image of the document illuminated by the light source on the light receiving elements;

a plurality of printing elements mounted on the substrate in a row in the same direction as in the light receiving elements; and a writing circuit provided in the substrate for controlling the printing elements, and characterized in that the reading circuit, the printing elements and the writing circuit are provided in a same surface of the substrate, and that the substrate is provided with one connector electrically connected with each of the reading circuit, the printing elements and the writing circuit.

According to the image processing apparatus having the constitution described above, the following effects are obtained.

First, the two platen rollers for feeding the document and for feeding the recording paper can be faced directly or indirectly, to the corresponding light receiving elements or the printing elements provided on the same surface of the substrate of the integrated image reading/writing head. Thus, differing from the prior art, there is no need for disposing the two platen rollers to sandwich the whole of the integrated image reading/writing head, and it becomes possible to make the image processing apparatus as a whole thinner than before.

Second, when manufacturing the integrated image reading/writing head, the reading circuit, the printing elements and the writing circuit as well as the relevant wiring patterns should be mounted only on one same surface of the substrate. Therefore, there is no need to turn over the substrate in order to mount these components. Therefore, it becomes possible to increase productivity in the manufacture of the integrated image reading/writing head, and productivity in the manufacture of the image processing apparatus incorporating the integrated image reading/writing head than in the prior art.

Third, the number of connectors can be reduced to one, which is smaller than in the prior art. Therefore, productivity in the manufacturing of integrated image reading/writing head and of the image processing apparatus can be further increased. Further, because of the smaller number of connectors, wiring operation for electrically connecting the integrated image reading/writing head with an external component becomes accordingly easier.

According to a preferred embodiment of the present invention, the substrate has a first edge portion and a second edge portion each extending in a predetermined direction. The first edge portion is uncovered by and on a side of the case, and the printing elements are mounted on this uncovered part.

With such an arrangement as the above, the platen roller for feeding the recording paper can be disposed at a high space efficiency on the side of the case while appropriately enclosing the light receiving elements by using the case.

According to another preferred embodiment of the present invention, the connector is attached to the second edge portion of the substrate.

With such an arrangement as the above, the connector does not interfere with the feeding of the recording paper when the recording paper is fed while being faced to the printing elements provided in or near the first edge portion of the substrate.

According to another preferred embodiment of the present invention, the connector is attached to a longitudinal center portion in the second edge portion. Further, the surface of the substrate is provided with a common electrode wiring and a common grounding wiring capable of supplying electric power to the printing elements, each of the wirings has a straight portion extending longitudinally of the substrate, and the straight portions sandwich the printing elements. Further, one of the straight portions of the common electrode wiring and the common grounding wiring has two longitudinal ends connected with the connector, whereas the other of the straight portions of the common electrode wiring and the common grounding wiring has a longitudinally center portion connected with the connector.

With such an arrangement as this, it becomes possible to equalize the amount of electric current supplied from outside via the connector, the common wiring and the common grounding wiring to each of the printing elements. Specifically, in a comparison between the printing element disposed closely to the longitudinal end portion of the substrate and the printing element disposed closely to the longitudinal center portion of the substrate, for example, the former is closer to the connector than the latter in terms of distance along the common electrode wiring. However, in this case, the former is farther from the connector than the latter in terms of distance along the common grounding wiring. Therefore, if there is a voltage drop due to electric resistance in each of the common electrode wiring and the common grounding wiring, it is possible to equalize or generally equalize the amount of electric current flowing through each of the printing elements. As a result, it becomes possible to decrease thickness inconsistency in the printed image.

According to another preferred embodiment of the present invention, the surface of the substrate is provided with a grounding wiring for the reading circuit and a separate grounding wiring for the writing circuit.

With such an arrangement as the above, it becomes possible to prevent various signals processed in the reading circuit from entering the writing circuit via the grounding wiring as noise. Likewise, it becomes possible to prevent various signals processed in the writing circuit from entering the reading circuit via the grounding wiring as noise. Therefore, quality of the read image and printed image can be increased.

According to another preferred embodiment of the present invention, the reading circuit is constituted by a plurality of sensor IC chips each incorporating an integrated circuit as a unit of the reading circuit. Further, the writing circuit is constituted by a plurality of drive IC chips each incorporating an integrated circuit as a unit of the writing circuit.

With such an arrangement as the above, the reading circuit and the writing circuit can be made easily by using the sensor IC chips and the drive IC chips.

According to another preferred embodiment of the present invention, the reading circuit and the writing circuit are constituted by a plurality of IC chips each incorporating an integrated circuit as a unit of the reading and writing circuits.

With such an arrangement as the above, a total number of the IC chips used for constituting the reading circuit and the writing circuit can be decreased, and therefore productivity in the manufacture of the integrated image reading/writing head can be further increased.

According to another preferred embodiment of the present invention, each of the IC chips is oblong rectangular, having a first edge portion and a second edge portion each extending in a predetermined direction. Further, the first edge portion has a surface provided with the light receiving elements in a row, and the second edge portion has a surface provided with a plurality of electrode pads for connection with the printing elements.

With such an arrangement as the above, the signal pads can be provided at a high space efficiency on the IC chip without disturbing the linearity of the array of the light receiving elements. Therefore, the reflected light from the linear region of the document can be appropriately received by the light receiving elements, and the connection of the electrode pads to the printing elements can also be performed appropriately.

According to another preferred embodiment of the present invention, the electrode pads are disposed in a row shorter than the row of the light receiving elements, and the second edge portion has two longitudinal edge portions provided with a plurality of signal pads for signal inputting and outputting, sandwiching the electrode pads.

With such an arrangement as the above, the signal pads can be provided at a high space efficiency without disturbing the array of the light receiving elements.

According to another preferred embodiment of the present invention, the second edge portion is further provided with a plurality of grounding pads.

With such an arrangement as the above, by grounding the grounding pads provided in each of the IC chips, and by making a grounding connection at a plurality of locations in a single IC chip, it becomes possible stabilize the level of the grounding.

According to another preferred embodiment of the present invention, the printing elements are heating elements.

With such an arrangement as the above, by heating the heating elements, printing can be made by using a thermosensible method or a thermal-transfer method.

According to another preferred embodiment of the present invention, the light source is disposed on said surface of the substrate.

With such an arrangement as the above, operation for incorporating the light source into the integrated image reading/writing head can also become easy, making possible to further increase productivity in the manufacture of the integrated image reading/writing head.

According to another preferred embodiment, the light source is electrically connected with the connector.

With such an arrangement as the above, power supply to the light source can also be performed through the connector, eliminating need for a connector dedicated to the light source, making possible to further increase productivity in the manufacture of the integrated image reading/writing head.

The image processing apparatus provided by a second aspect of the present invention comprises an integrated image reading/writing head, and the integrated image reading/writing head includes:

a substrate provided with a reading circuit including a plurality of light receiving elements disposed in a row, a case assembled to the substrate and enclosing the light receiving elements;

a transparent cover attached to the case, spaced from and opposed to the substrate and to be tightly contacted by a document being fed;

a light source disposed within the case for illuminating the document;

a plurality of lenses disposed within the case for focusing an image of the document illuminated by the light source on the light receiving elements;

a plurality of printing elements mounted on the substrate in a row in the same direction as in the light receiving elements; and a writing circuit provided in the substrate for controlling the printing elements.

The above image processing apparatus is characterized in that the reading circuit, the printing elements and the writing circuit are provided in a same surface of the substrate, and that the substrate is provided with one connector electrically connected with each of the reading circuit, the printing elements and the writing circuit.

According to the image processing apparatus with the constitution described as above, the same effect as obtained in the integrated image reading/writing head provided by the first aspect of the present invention can be obtained.

Other characteristics and advantages of the present invention will become clearer from the description of the preferred embodiments hereinafter.

BEST MODE FOR CARRYING OUT THE INVENTION

Hereinafter, embodiments of the present invention will be described with reference to the accompanying drawings.

FIG. 1~FIG. 10 show an integrated image reading/writing head 1 as a first embodiment of the present invention. In these figures, elements identical with or similar to those in the prior art described earlier are indicated by the same alpha-numeral codes as used in the prior art.

Figure 2:
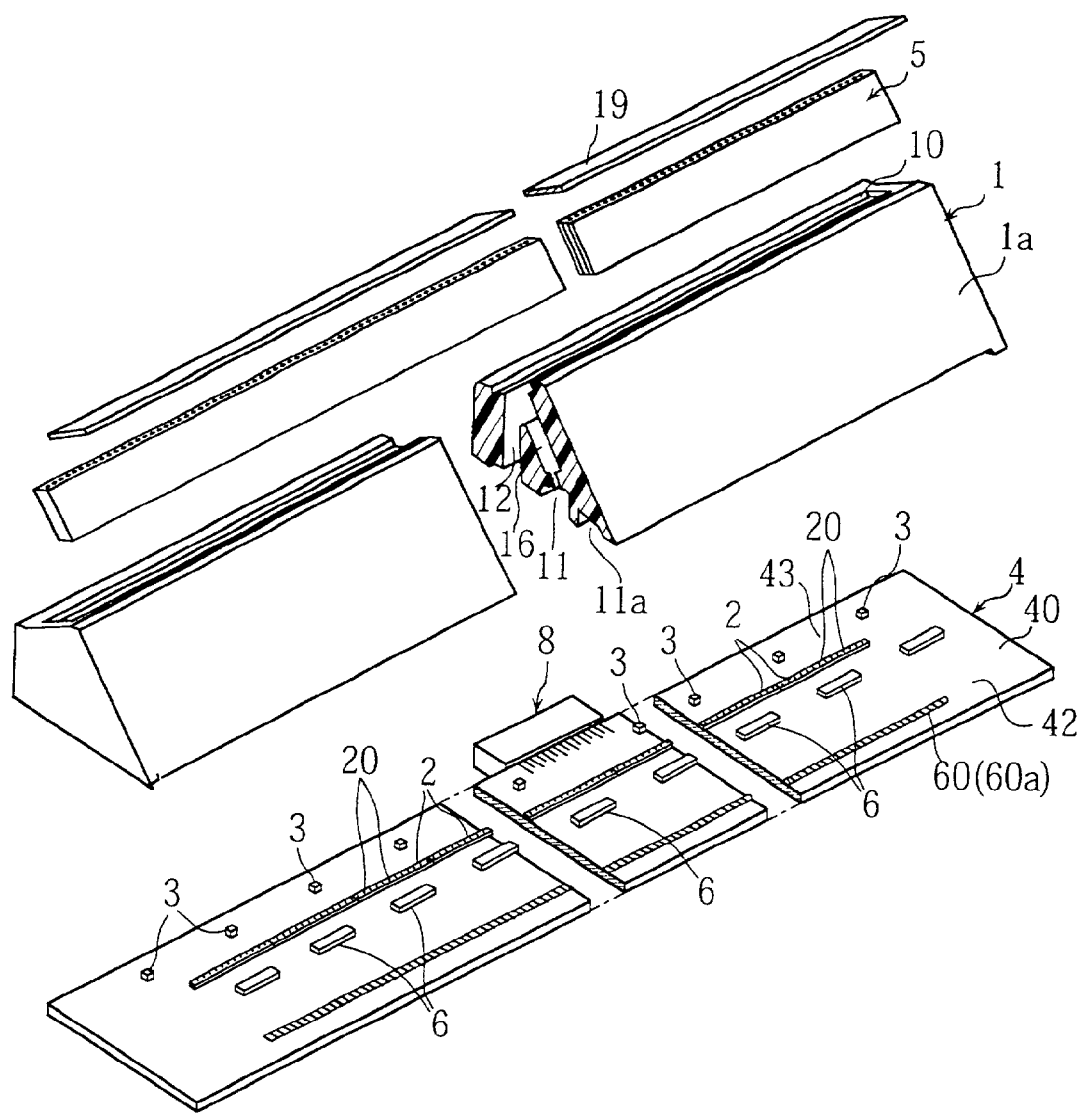
FIG. 2 is an exploded perspective view of an integrated image reading/writing head in FIG. 1.

As clearly shown in FIG. 2, the integrated image reading/writing head x according to the present embodiment comprises a case 1, a transparent cover 19, a lens array 5, a substrate 4, a plurality of sensor IC chips 2 constituting a reading circuit, a plurality of light sources 3, a plurality of heating elements 60, a plurality of drive IC chips 6 constituting a writing circuit, and a connector 8.

The substrate 4 is made of ceramic for example, and is oblong rectangular. The substrate 4 has a surface (upper surface) 40 mounted with each of the sensor IC chips 2, the light sources 3, the heating elements 60 and the drive IC chips 6.

The case 1 is made of a synthetic resin for example, extending in a predetermined direction. The case 1 is formed with a space 12 having an upper opening and a lower opening, a groove 16 communicating with the space 12, a recess 11 communicating with the groove 16, and another recess 11a adjacent to the recess 11, each extending longitudinally of the case 1. As shown clearly in FIG. 1, the case 1 is assembled to the surface 40 of the substrate 4, surrounding each of the light sources 3, the sensor IC chips 2 and the drive IC chips 6.

The substrate 4 has a first edge portion 42 extended out on one side of the case 1. The heating elements 60 are mounted on the surface of this extended portion. The case 1 has a side surface 1a bordering on and rising from the extended portion of the substrate 4. The side surface 1a is slanted to be farther away from the extended portion at a higher elevation of the case 1. With such an arrangement as this, as clearly shown in FIG. 1, it becomes possible when the platen roller $P_2$ is disposed to face the extended portion, to place the platen roller $P_2$ closely to the case 1 while avoiding interference between the platen roller $P_2$ and the side surface 1a. However, the present invention is not limited by this, and the side surface 1a may not be slanted.

The transparent cover 19 is to guide a document, and is formed as a plate of glass or synthetic resin. The transparent resin 19 is opposed to and spaced from the surface 40 (upper surface) of the substrate 4, and is fitted into a recess 10 provided in the upper surface of the case 1. According to the present embodiment, the transparent cove 19 is slanted. With such an arrangement as this, the distance between the two platen rollers $P_1$, $P_2$ can be reserved advantageously while placing the platen roller $P_1$, which is faced to the transparent cover 19, closely to the substrate 4. However, the present invention is not limited by this, and the transparent cover 19 may be parallel to the substrate 4.

The lens array 5 includes a plurality of selfoc lenses 51 held in a row by a lens holder 50 extending in a predetermined direction. The lens array 5 is fitted into a groove 16 of the case 1, thereby faced toward the transparent cover 19. The upper surface of the transparent cover 19 includes an image reading line L in a region facing the lens array 5. Each of the selfoc lenses 51 focuses an image of a document D without magnification nor inversion on one of the light receiving elements 20. However, the present invention is not limited by this, and a convex lens may be used alternatively.

The light sources 3 are provided by an LED chip for example, and mounted in a row, longitudinally of the substrate 4 at an appropriate interval. These light sources 3 are located in a bottom portion of the space 12. Therefore, light emitted from these light sources 3 travels through the space 12 toward the reading line L.

Figure 3:
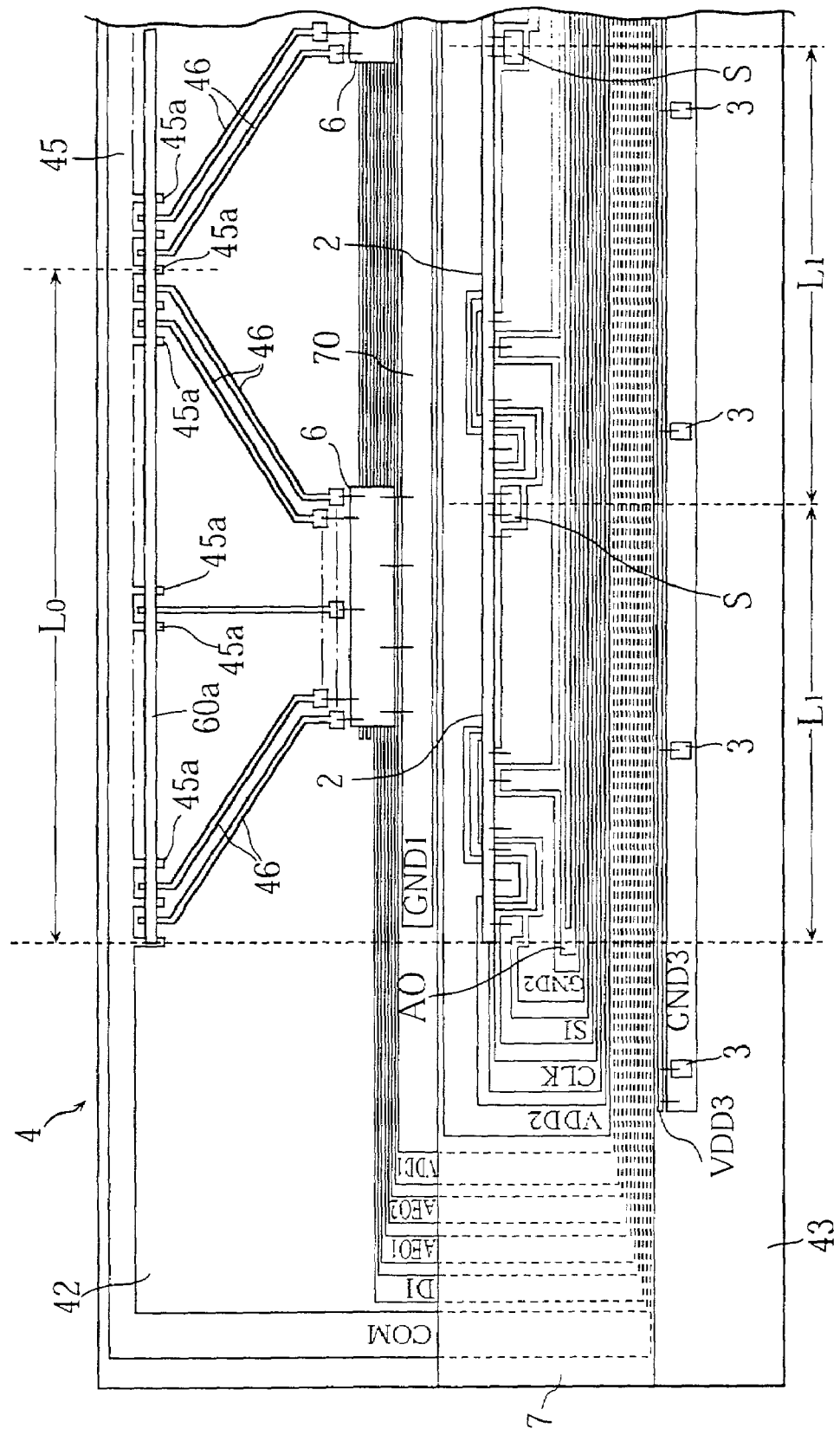
FIG. 3 is an enlarged plan view showing a longitudinal edge portion of a substrate included in the integrated image reading/writing head in FIG. 1.
Figure 4:
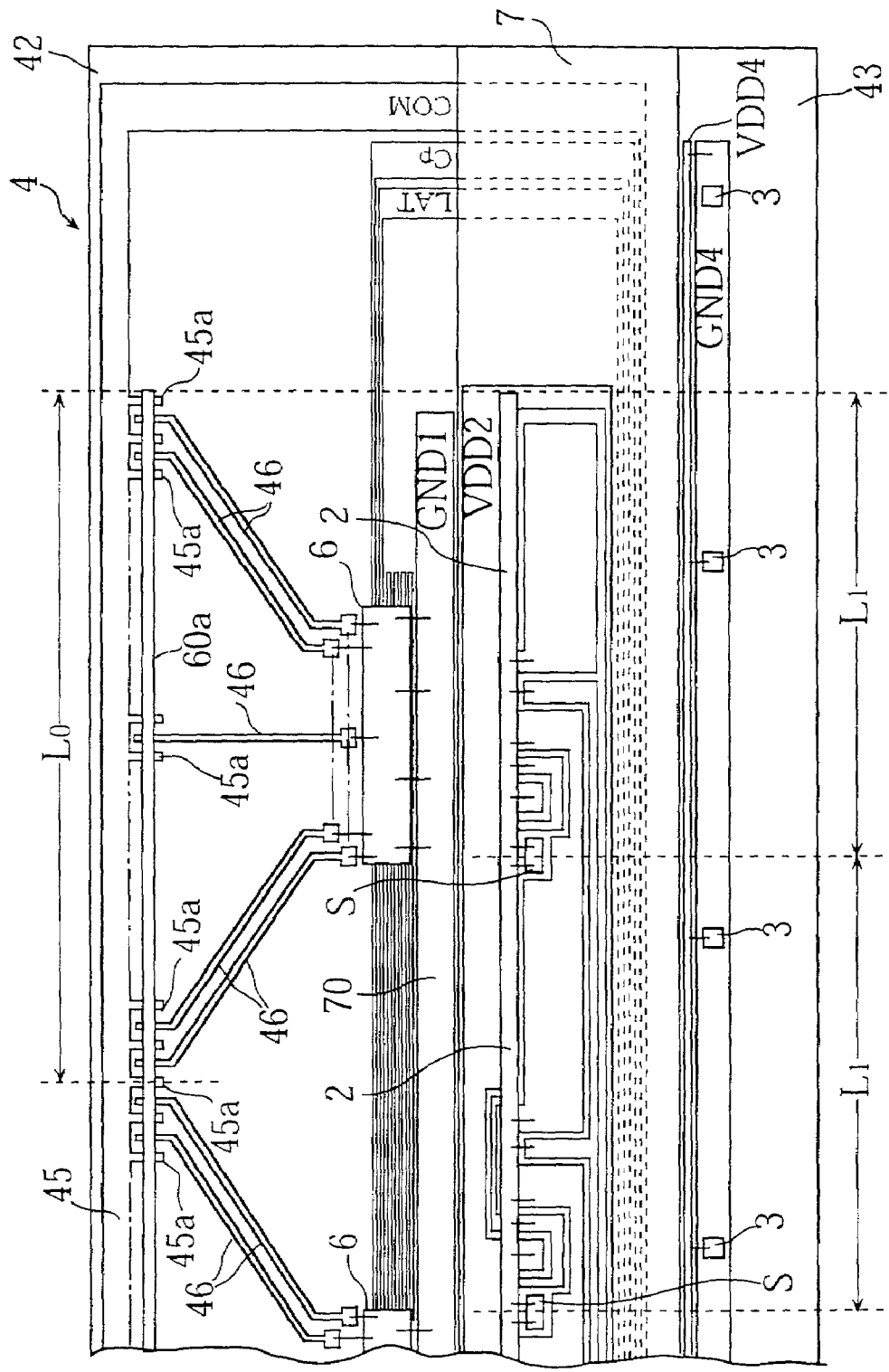
FIG. 4 is an enlarged plan view showing another longitudinal edge portion of the substrate included in the integrated image reading/writing head in FIG. 1.

Each of the sensor chips 2 is provided by a semiconductor chip including an integrally formed plurality of light receiving elements 20 and mounted in a row, longitudinally of the substrate 4. The sensor IC chips 2 are disposed in the recess 11 of the case 1 for reception of the light coming through the lens array 5. A longitudinal range indicated by an alphanumeral code $L_1$ in FIG. 3 and FIG. 4 represents one of the IC chips 2. If a total of 96 light receiving elements 20 are formed in each of the sensor IC chips 2 for example, and if a document of size A4 is to be read at a reading density of 8 dots/mm, then a total of 18 sensor IC chips 2 are mounted on the substrate 4, and by serially connecting respective inside circuits, a reading circuit having a total of 1728 light receiving elements 20 is provided.

Figure 9:
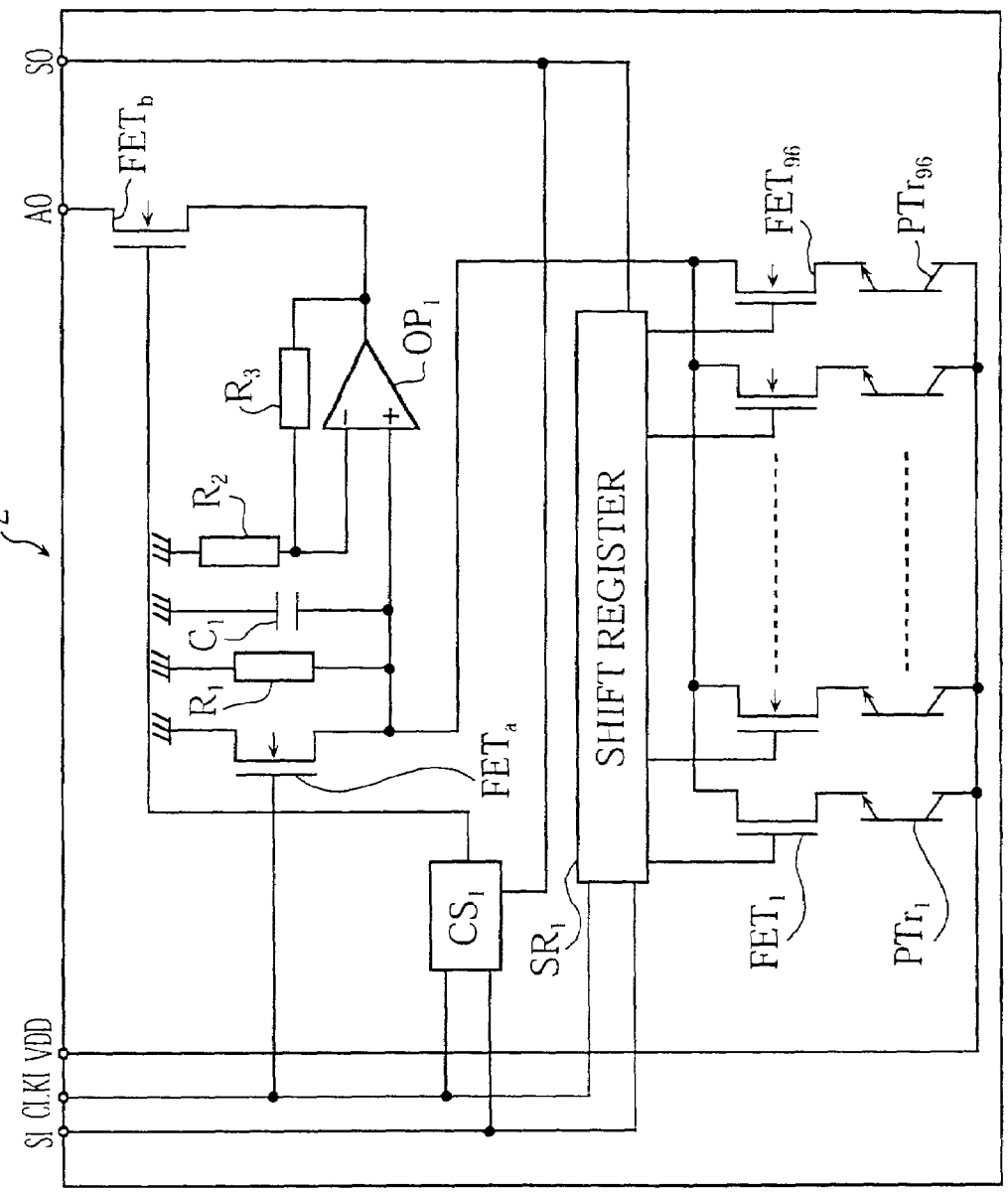
FIG. 9 is a circuit block diagram inside a sensor IC chip incorporated in the integrated image reading/writing head in FIG. 1.

FIG. 9 shows a specific constitution in each of the sensor IC chips 2. Specifically, each of the sensor IC chips 2 includes for example, 96 phototransistors $PTr_1 \sim PTr_{96}$, 96 field effect transistors $FET_1 \sim FET_{96}$, a shift register $SR_1$, for light reception, a chip selection circuit $CS_1$, an operational amplifier $OP_1$, field effect transistors $FET_a$, $FET_b$, a capacitor $C_1$, resistors $R_1 \sim R_3$, and pads SI, CLKI, VDD, AO, and SO. The phototransistors $PTr_1 \sim PTr_{96}$ provide the light receiving elements 20 which output read image signal corresponding to the image on the document D upon reception of the light reflected by the document D. The field effect transistors $FET_1 \sim FET_{96}$, the shift register $SR_1$, the chip selection circuit $CS_1$, the operational amplifier $OP_1$, the field effect transistors $FET_a$, $FET_b$, the capacitor $C_1$, and resistors $R_1 \sim R_3$ provides a control circuit for sequentially taking out the output from the phototransistors $PTr_1$, $PTr_{96}$.

In each of the phototransistors $PTr_1 \sim PTr_{96}$, the collector is connected with the pad VDD, the emitter is connected to the drain of the corresponding field effect transistors $FET_1 \sim FET_{96}$. In each of the field effect transistors $FET_1 \sim FET_{96}$ the gate is connected with the output end of the shift register $SR_1$ and all of the sources is commonly connected to the drain of the field effect transistor $FET_a$ and the non-inverting input end of the operational amplifier $OP_1$. In the field effect transistor $FET_a$, the gate is connected to the pad CLKI, and the source is grounded. In the operational amplifier $OP_1$, the output end is connected with the drain of the field effect transistor $FET_b$ and an end of the resistor $R_3$, and the inverting input end is connected with the other end of the resistor $R_3$ and an end of the resistor $R_2$. The non-inverting input end of the operational amplifier $OP_1$, the drain of the field effect transistor $FET_a$ and the source of the field effect transistors $FET_1 \sim FET_{96}$ meet at a point, where an end of the resistor $R_1$ and end of the capacitor $C_1$ are connected. The other ends of the resistors $R_1$, $R_2$ and the other end of the capacitor $C_1$ are grounded. In the field effect transistor $FET_b$, the gate is connected to the output end of the chip selection circuit $CS_1$, and the source is connected with the pad AO.

The shift register $SR_1$ sequentially outputs drive pulse to the gates of the field effect transistor $FET_1 \sim FET_{96}$ in synchronization with a clock signal inputted via the pad CLKI upon reception of the serial-in signal inputted via the pad SI. More specifically, the serial-in signal is first inputted to the first bit of the shift resistor $SR_1$, which turns on the first bit of the shift register $SR_1$ to apply voltage to the gate of the field effect transistor $FET_1$. This turns on the field effect transistor $FET_1$, and the electric charge stored in the phototransistor $PTr_1$ as the light receiving element is supplied to the non-inverting input end of the operational amplifier $OP_1$. Then, for each input of the clock signal, the serial-in signal is forwarded to the next step in the shift register $SR_1$. As a result, the electric charges, i.e. read image signals, stored in the phototransistor $PTr_1 \sim PTr_{96}$, are sequentially supplied to the non-inverting input end of the operational amplifier $OP_1$. The read image signal is amplified by the operational amplifier $OP_1$ and then outputted to the pad AO via the field effect transistor $FET_b$ acting as an analog switch, and then sent out of the integrated image reading/writing head X via the connector 8.

The serial-in signal forwarded to the final bit of the shift register $SR_1$ is outputted as a serial-out signal to the pad SO and the chip selection circuit $CS_1$, upon reception of the next clock signal. The serial-out signal outputted to the pad SO is the supplied as the serial-in signal to the pad SI of another sensor IC chip in the next step via the wiring pattern on the substrate 4.

The chip selection circuit $CS_1$ turns on/off the field effect transistor $FET_b$ in synchronization with the clock signal inputted to the pad CLKI from the time when the serial-in signal is inputted to the pad SI to the time when the serial-out signal is outputted to the pad SO. More specifically, the chip selection circuit $CS_1$ supplied with the serial-out signal shuts off the drive signal supplied to the gate of the field effect transistor $FET_b$, turning off the field effect transistor $FET_b$. This shuts off the output from the operational amplifier $OP_1$ to the pad AO, making possible to effectively prevent noise and so on amplified by the operational amplifier $OP_1$, from being outputted to the pad AO.

The field effect transistor $FET_a$ acting as an analog switch turns on/off in synchronization with the clock signal inputted to the pad CLKI, thereby switching between a state in which the electric charge outputted via the field effect transistors $FET_1 \sim FET_{96}$ is supplied to the operational amplifier $OP_1$ and a state in which the electric charge is grounded. The capacitor $C_1$ and the resistor $R_1$ rectify the outputted waveform from the phototransistors $PTr_1$–$PTr_{96}$. The resistors $R_2$, $R_3$ determines the level of amplification by the operational amplifier $OP_1$. Each of the sensor IC chips 2 has the circuit described above, collectively constituting a circuit capable of reading a line of document image by using the light receiving elements 20.

The heating elements 60 are provided in a row longitudinally of the substrate 4. The heating elements 60 are provided by a heating resistor 60a. More specifically, as clearly shown in FIG. 6, each of the heating elements 60 is created by forming a plurality of comb-like electrodes 45a and a plurality of individual electrodes 46 beneath the heating resistor 60a which extends longitudinally of the substrate 4. The heating resistor 60a is formed for example by printing and baking a film of electrically conductive paste. Each of the electrodes 45a is supplied with a voltage via a connection with a straight portion 45 of a common electrode wiring COM to be described later. Each of the individual electrodes 46 is connected to a pad DO, to be described later, of the drive IC chip 6, and switched on/off to a grounding. With the arrangement shown in FIG. 6, when the grounding connection of the individual electrode 46 (46a) is switched on, electric current passes through a portion of the heating resistor 60a sandwiched by two electrodes 45a with this particular individual electrode 46 in between, making this portion functioning as a dot of the heating elements.

Figure 1:
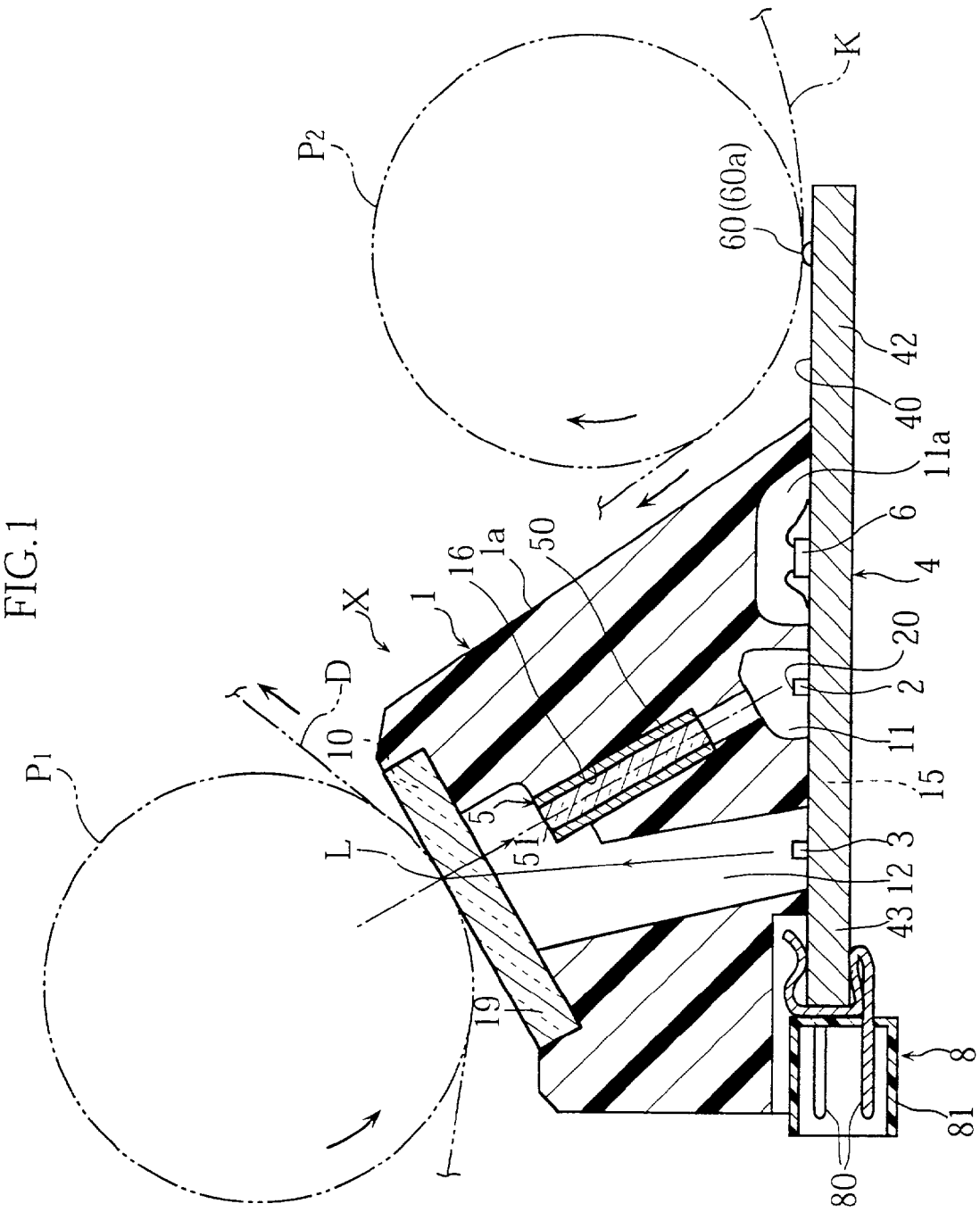
FIG. 1 is a sectional view of an integrated image reading/writing head as a first embodiment of the present invention.

In FIG. 1 and FIG. 2, the drive IC chips 6 control heating action of assigned heating elements 60, and are mounted in a row longitudinally of the substrate 4 at an appropriate interval and inside of the recess 11a of the case 1. Each of the drive IC chips 6 drives an assigned number of heating elements 60 provided within a longitudinal range indicated by alpha-numeral code $L_0$ in FIG. 3 and FIG. 4. If one drive IC chip 6 can drive 144 dots of the heating elements 60, and if printing is to be made on a recording paper having the width of size A4 at a recording density of 8 dots/mm, a total of 12 drive IC chips 6 must be mounted on the substrate 4, and by serially connecting the inside circuits, the printing drive circuit corresponding to a total of 1728 dots of heating elements 60 is provided.

Figure 10:
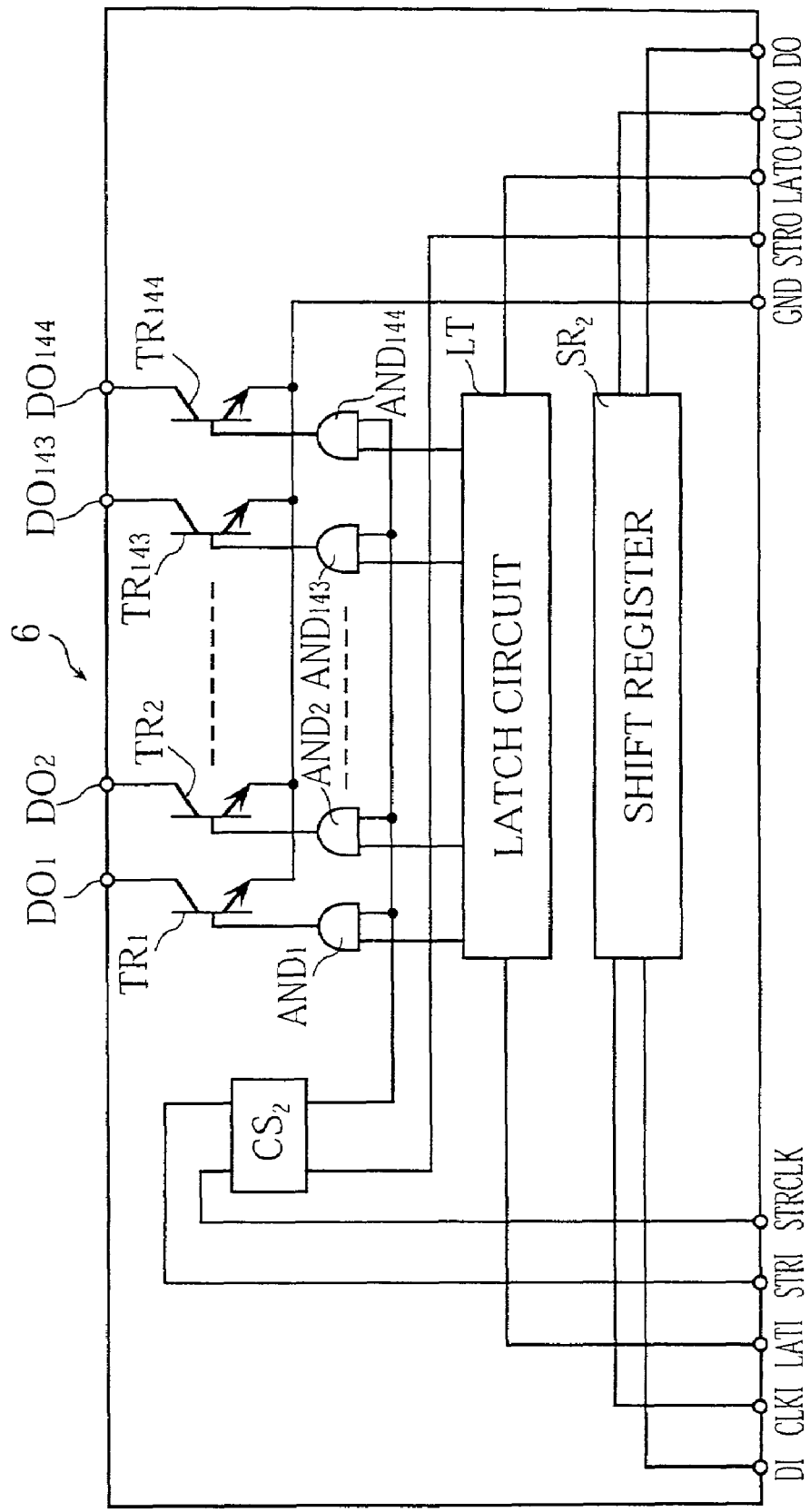
FIG. 10 is a block diagram of a circuit inside a drive IC chip incorporated in the integrated image reading/writing head in FIG. 1.

Each of the drive IC chips 6 has a constitution as shown in FIG. 10. Specifically, each of the drive IC chips 6 includes a chip selection circuit $CS_2$, a latch circuit LT, a shift register $SR_2$, 144 AND circuits $AND_1$, $AND_{144}$, 144 bipolar transistors $TR_1$–$TR_{1441}$, and pads DI, CLKI, LATI, STRI, STRCLK, GND, STRO, LATO, CLKO, DO, and $DO_1$–$DO_{144}$. The bipolar transistors $TR_1$–$TR_{144}$ function as switches to energize respective heating elements 60.

In each of the $AND_1$–$AND_{144}$, the output end is connected to the base of corresponding bipolar transistors $TR_1$–$TR_{144}$, one of the input ends is connected to the output end of he latch circuit LT, and the other end is connected to one output end of the chip selection circuit $CS_2$. In each of the bipolar transistors $TR_1$–$TR_{144}$ the emitter is commonly connected to the pad GND, the collector is connected to corresponding one of the pads $DO_1$–$DO_{144}$.

The shift register $SR_2$ sequentially forwards record image data inputted serially into the first bit via the pad DI to the second and following bits in synchronization with a clock signal inputted via the pad CLKI, thereby temporarily storing the 144 bits of record image data. The record image data in the last bit of the shift register $SR_2$ is then outputted to the pad DO upon reception of the next clock signal, and supplied to the pad DI of the next drive IC chip 6. Further, the clock signal inputted to the shift register $SR_2$ via the pad CLKI is outputted from the shift register $SR_2$ to the CLKO, and supplied to the pad CLKI of the next IC chip 6. The clock signal supplied to the shift register $SR_2$ is the same clock signal as supplied to the shift register $SR_1$, of the sensor IC chip 2. Specifically, according to the present embodiment, one clock signal is commonly used as the clock signal for timing control in each of the sensor IC chips 2 and for timing control in each of the drive IC chips 6.

The latch circuit LT captures and stores the record image data stored in each bit of the shift register $SR_2$ upon reception of the latch signal via the pad LATI. The latch signal inputted to the latch circuit LT, is then outputted from the latch circuit LT to the pad LATO, and then supplied to the pad LATI of the next drive IC chip 6 via the wiring pattern of the second substrate.

The chip selection circuit $CS_2$ has one input end supplied with the strobe signal via the pad STRI, and the other input end supplied with a strobe clock signal via the pad STR-CLK, and based on these two signals, generates a new strobe signal, and outputs this new strobe signal from both output ends. The new strobe signal outputted from one of the output ends is inputted to said other input end of the AND circuits $AND_1$–$AND_{144}$, whereas the new strobe signal outputted from the other of the output ends is supplied to the pad STRO. The strobe signal supplied to the pad STRO is supplied to the pad STRI of the next drive IC chip 6 via the wiring pattern of the substrate 4. The chip selection circuit $CS_2$, which includes a D flip-flop circuit working in synchronization with the rise of the strobe clock signal inputted to its other input end via the pad STRCLK, outputs a high-level signal if the strobe signal inputted to its first input end is high-level and outputs a low-level signal if the strobe signal is low-level. When the chip selection circuit $CS_2$ of the first-stage drive IC chip 6 of the total of 12 drive IC chip is supplied with the strobe signal, e.g. the latch signal, the output of the chip selection circuit $CS_2$ becomes high level at the rise of the next strobe clock signal. At the rise of the following strobe clock signal, since the latch signal is already in the low level, the output from the chip selection circuit $CS_2$ changes to the low level. Therefore, the chip selection circuit $CS_2$ outputs a strobe signal which assumes the high level state only during the period corresponding to one period of the strobe clock signal. Since this strobe signal is inputted as the strobe signal to the chip selection circuit $CS_2$ of the next-stage drive IC chip 6, the chip selection circuit $CS_2$ of the next-stage drive IC chip 6 outputs a strobe signal which rises simultaneously with the rise of the strobe signal generated by the chip selection circuit $CS_2$ of the previous stage and stays in the high level only during the period corresponding to one period of the strobe clock signal. As exemplified as above, each of the chip selection circuits $CS_2$ in the 12 drive IC chips 6 consecutively generates the new strobe signal so as to avoid timing overlap.

When the new strobe signal is outputted from said one output end of the chip selection circuit $CS_2$, said other input end of the AND circuits $AND_1$–$AND_{144}$ becomes high level, and the signal at the output end of the AND circuits $AND_1$–$AND_{144}$ becomes identical with the output of the latch circuit LT. Specifically, depending upon the content of each bit of the record image data stored in the latch circuit LT, the level of the output end of the AND circuits $AND_1$–$AND_{144}$ is determined, which determines the on/off state of the bipolar transistors $TR_1$–$TR_{144}$. Since the electrode pads $DO_1$–$DO_{144}$ are connected to corresponding one of the individual electrodes 46, if any of the bipolar transistors $TR_1$–$TR_{144}$ are turned on, then electricity is applied to heat the corresponding heating elements 60.

As clearly shown in FIG. 2, the connector 8 is provided at a longitudinal center portion of a second side edge portion of the substrate 4. The upper surface 40 of the substrate 4 is formed with wiring patterns electrically connected with the connector 8. As clearly shown in FIG. 3 –FIG. 5, these wiring patterns include those relevant to the heating elements 60 such as the common electrode wiring COM which has the plurality of comb-like electrodes 45a, and the individual electrodes 46. The wiring patterns relevant to the drive IC chips 6 includes, for example, a printing image data wiring DI, strobe signal wirings AEO1, AEO2, a power supply wiring VDD1, a common grounding wiring GND1, a latch signal wiring LAT, and a clock pulse signal wiring Cp. If two wirings AEO1, AEO2 are formed for two strobe signals, it becomes possible to drive one group of the heating elements 60 in the left half of the substrate 4 at a different timing from the other group of the heating elements 60 in the right half of the substrate 4.

Figure 8:
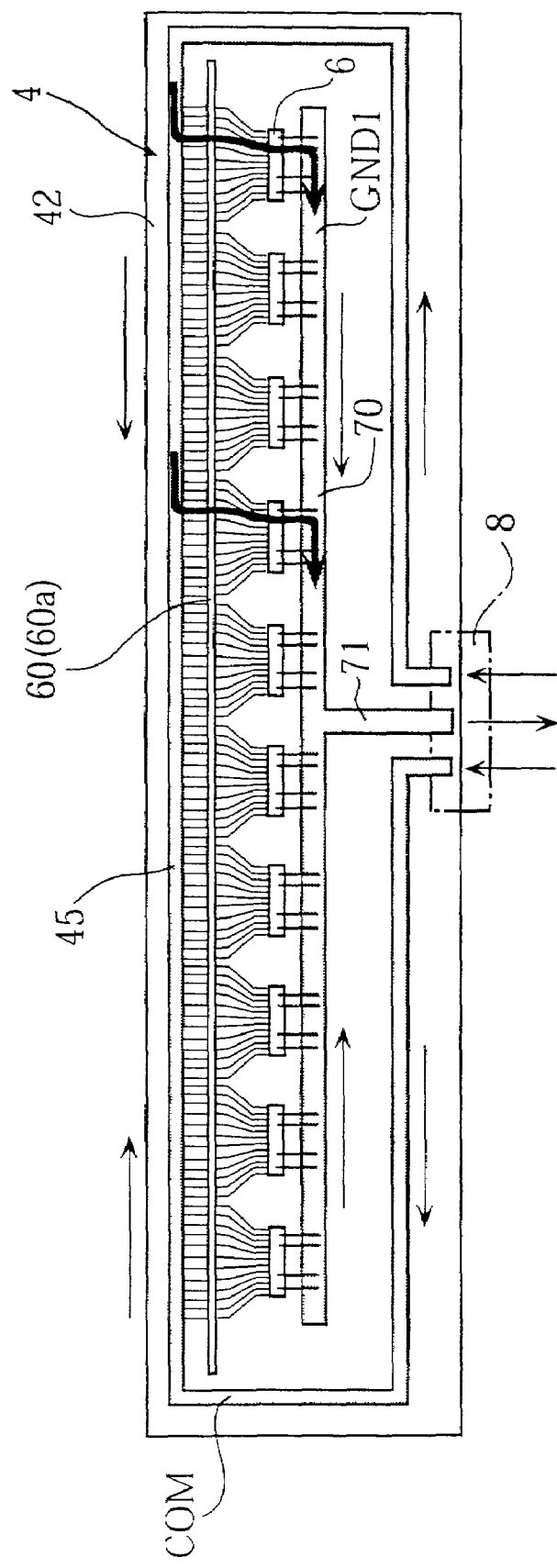
FIG. 8 is a plan view showing a general outline of a part of wiring pattern formed in the substrate.

The common electrode wiring COM and the common grounding wiring GND1 are respectively formed in patterns shown in FIG. 8. Specifically, the common electrode wiring COM is generally formed like a loop, with a straight portion 45 extending longitudinally along the first edge portion 42 of the substrate 4. At each end of the straight portion 45, the wiring turns along the end edge of the substrate 4, eventually leading to the connector 8. On the other hand, the common grounding wiring GND1 is generally formed like a letter T, with a straight portion 70 extending longitudinally of the substrate 4 closely along the array of the drive IC ships 6. The straight portion 70 has a longitudinally center portion, from which a connecting portion 71 branches out to connect directly with the connector 8. The heating elements 60 and the drive IC chips 6 are disposed between the two straight portions 45, 70, connected in parallel to respective wirings between the straight portions 45, 70.

The common electrode wiring COM is supplied with voltage via the connector 8. The common grounding wiring GND1 is grounded via the connector 8. With such an arrangement as this, in the straight portion 45 of the common electrode wiring COM, distance from the connector 8 becomes larger at a point closer to a longitudinally center portion of the substrate 4, with greater voltage drop. On the other hand, in the straight portion 70 of the common grounding wiring GND1, distance from the connector 8 becomes smaller at a point closer to the longitudinal center portion of the substrate 4, with lower electric potential. Therefore, it becomes possible to make the amount of electric current flowing through the heating elements 60 at either end portion of the substrate 4 generally the same as the amount of electric current flowing through the heating elements 60 at the longitudinally central portion of the substrate 4, making possible to heat each of the heating elements 60 at a generally uniform temperature.

Figure 5:
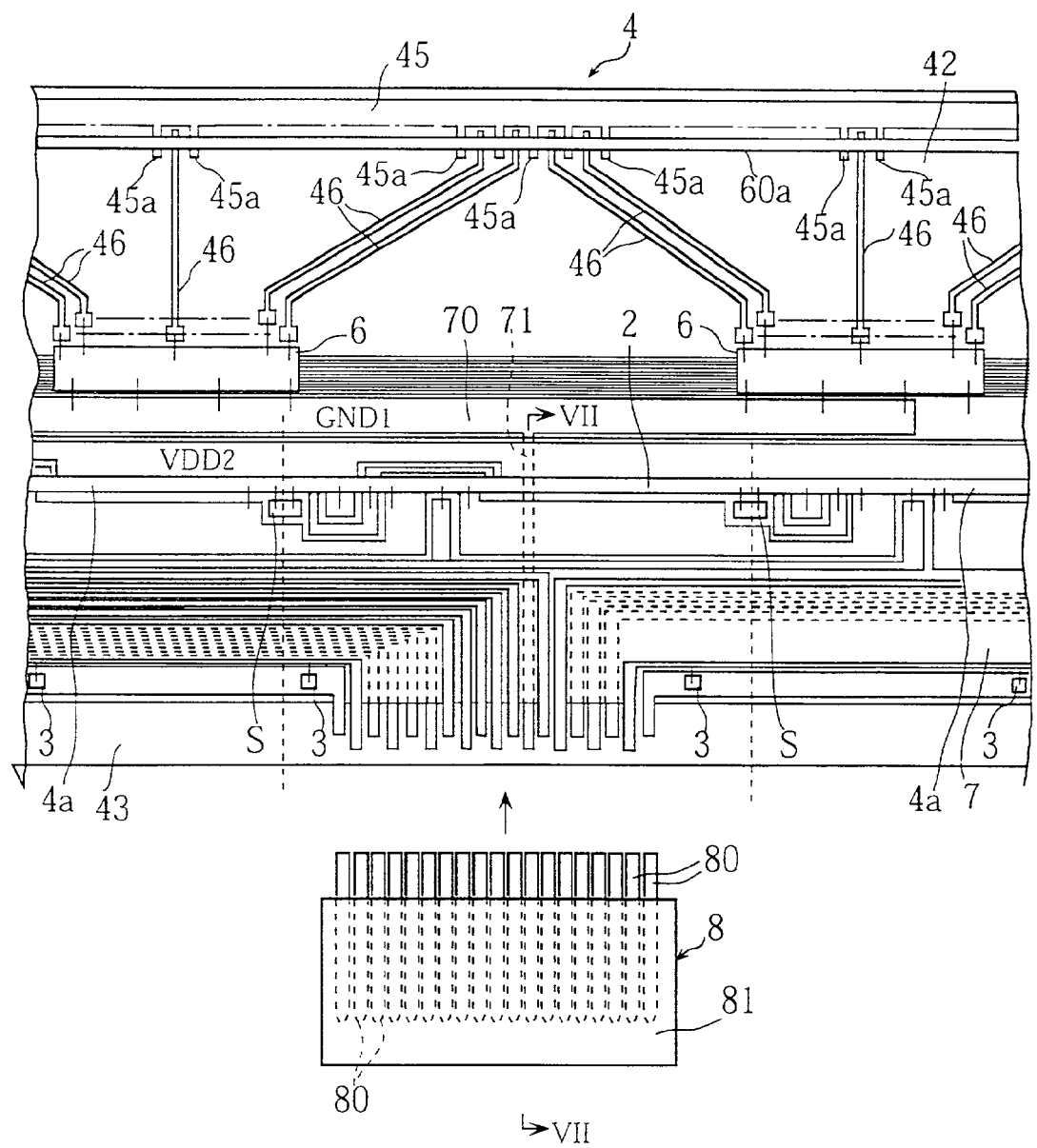
FIG. 5 is an enlarged plan view showing a longitudinal central portion of a substrate included in the integrated image reading/writing head in FIG. 1.
Figure 6:
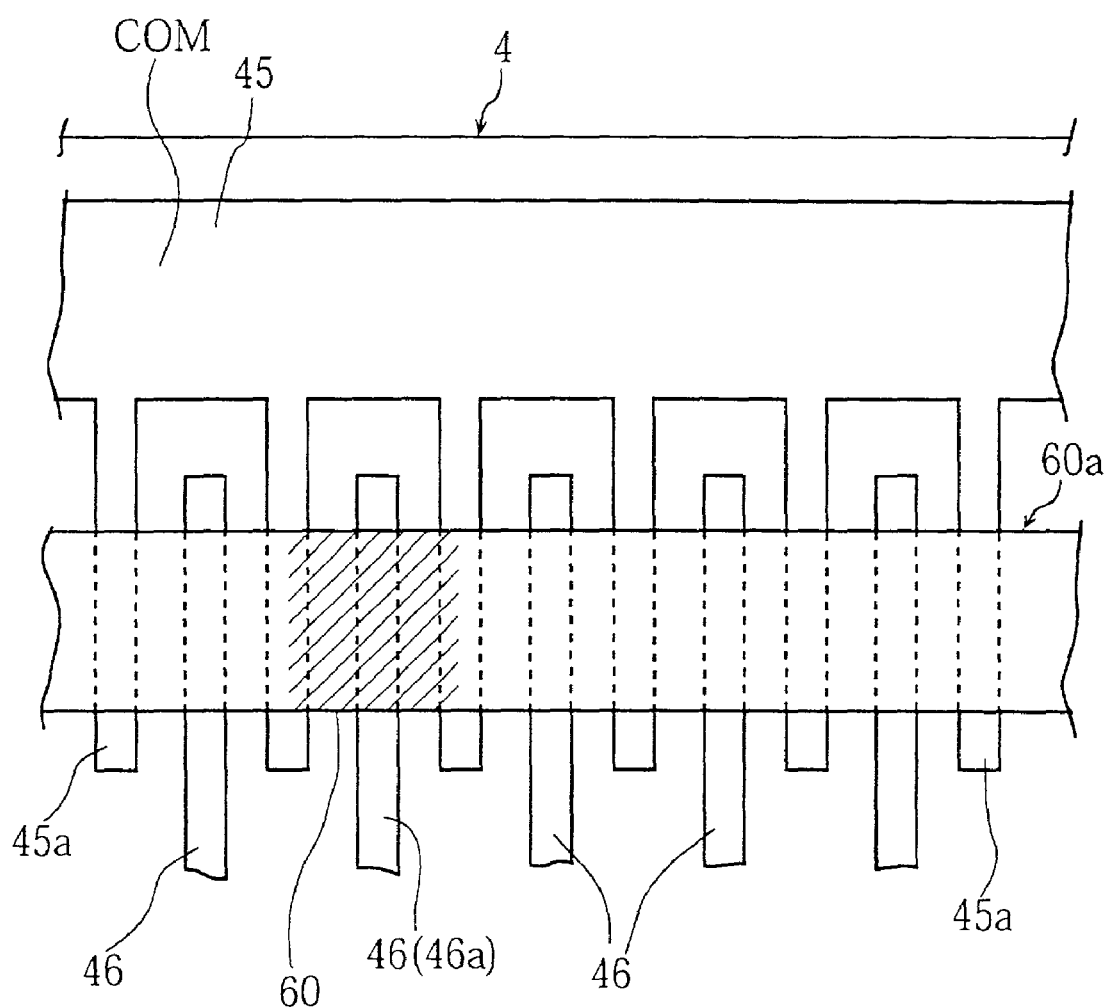
FIG. 6 is an enlarged plan view showing a principal portion of a heating element.

As clearly shown in FIG. 3 to FIG. 5, the wiring patterns relevant to the sensor IC chips 2 includes, for example, an analog data outputting wiring AO, a grounding wiring GND2, a serial signal wiring SI, a clock signal wiring CLK, and a power supply wiring VDD2. If the common grounding wiring of the drive IC chips 6 is to be formed in the shape like the letter T, the connecting portion 71 has to make a cross with the wiring for the sensor IC chips 2. However, as clearly shown in FIG. 7, if an insulating film 7 is formed on the common grounding wiring GND1, and if the wirings GND2, AO and VDD2 for the sensor IC chips 2 are formed on this insulating film, it becomes possible to avoid unwanted electrical connection of these wirings.

Each of the analog data outputting wiring AO, the grounding wiring GND2, the clock signal wiring CLK and the power supply wiring VDD2 is connected to each of the sensor IC chips 2 via a wire. Each of the sensor IC chips 2 is connected with each of the wirings electrically in parallel. The serial signal wiring SI is formed non-continuously, and is connected to the sensor IC chip 2 at the left end region in FIG. 3 via a wire. An island-like electrically conductive region S is formed closely to and between each adjacent pair of the sensor IC chips 2, and is connected to each of the adjacent sensor IC chips 2 via a wire, making possible to sequentially forward a serial signal from one to next sensor IC chips 2.

With the above arrangement, provision of the grounding wiring GND2 dedicated to the sensor IC chips 2 separately from the common grounding wiring GND1 provided for the drive IC chips 6 makes possible to protect the circuitry in each of the drive IC chips 6 from the adverse influence from various signals inputted to or outputted from each of the sensor IC chips 2. Further, conversely, it also becomes possible to prevent various signals inputted to or outputted from each of the drive IC chips 6 from adversely affecting the circuitry in each of the sensor IC chips 2. Therefore, differing from a case in which the sensor IC chips 2 and the drive IC chips 6 share the same grounding wiring, it becomes possible to reduce possibility that the read image and the printed image are adversely affected by noise, and to improve quality of these images.

The wiring patterns relevant to the light sources 3 include the grounding wirings GND3, GND4, and power supply wirings VDD3, VDD4. Each of the light sources 3 is mounted on the ground wiring GND3 or the ground wiring GND4, and is connected with the ground wiring GND3 or the ground wiring GND4 via a wire.

Figure 7:
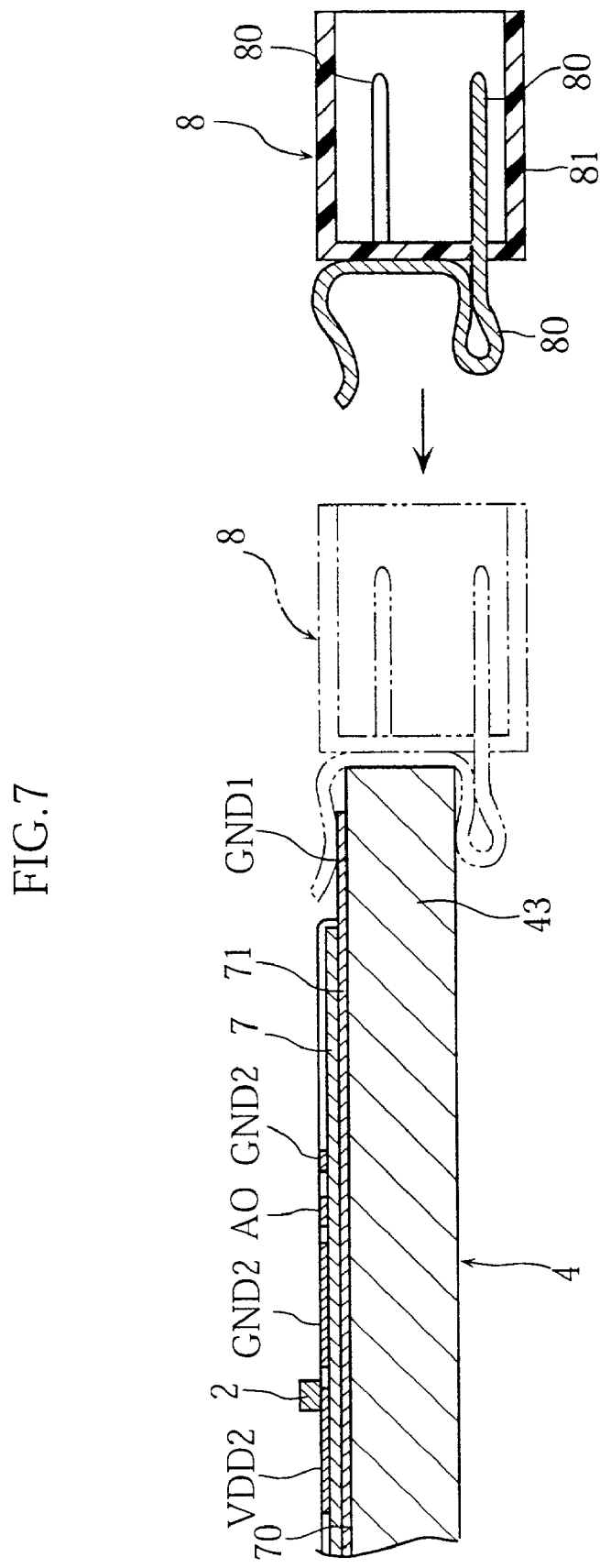
FIG. 7 is sectional view taken in lines VII—VII in FIG. 5.

Each of the wiring for the heating elements 60, the wiring for the drive IC chips 6, the wiring for the sensor IC chips 2, and the wiring for the light sources 3 are electrically connected with the connector 8. The connector 8 includes a number of connector pins 80 corresponding to the total number of input and output terminals of the above described wirings, and a connector case 81 enclosing the connector pins. The connector 8 is fastened to the substrate 4 by the connector pins 80 pinching the substrate 4 as shown in FIG. 5 and FIG. 7.

As shown in FIG. 1 and FIG. 2, the constitution of the integrated image reading/writing head X according to the present embodiment is that each of the light receiving elements 20, each of the heating elements 60 each of the drive IC chips 6 and each of the light sources 3 are mounted on the upper surface 4a of the substrate 4. Further, the wiring patterns relevant to these components are formed also on the upper surface 4a. Therefore, when forming the wiring patterns and mounting each of these components, there is no need for turning the substrate 4 over, and it becomes possible to increase productivity in the manufacture of the integrated image reading/writing head.

Figure 11:
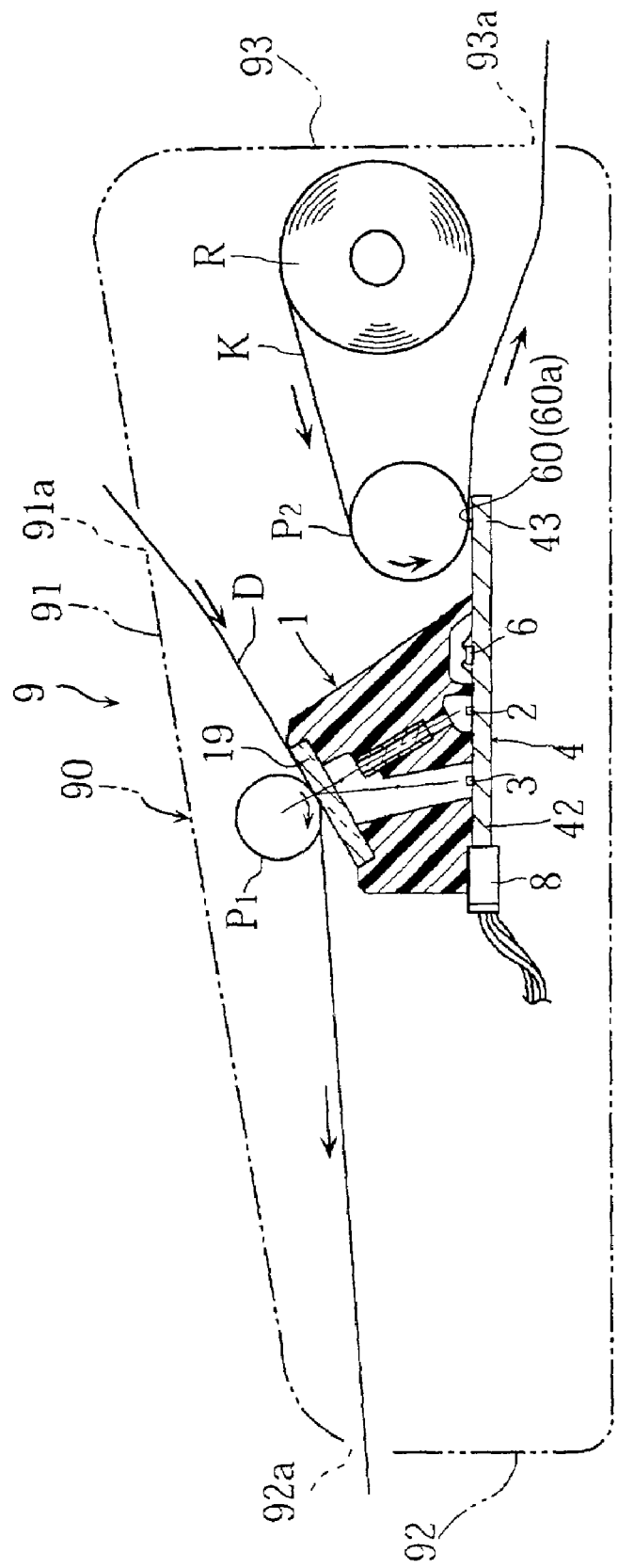
FIG. 11 is a sectional view showing an image processing apparatus according to the present invention.

Next, an image processing apparatus according to the present invention, incorporating the integrated image reading/writing head X will be described with reference to FIG. 11.

Figure 16:
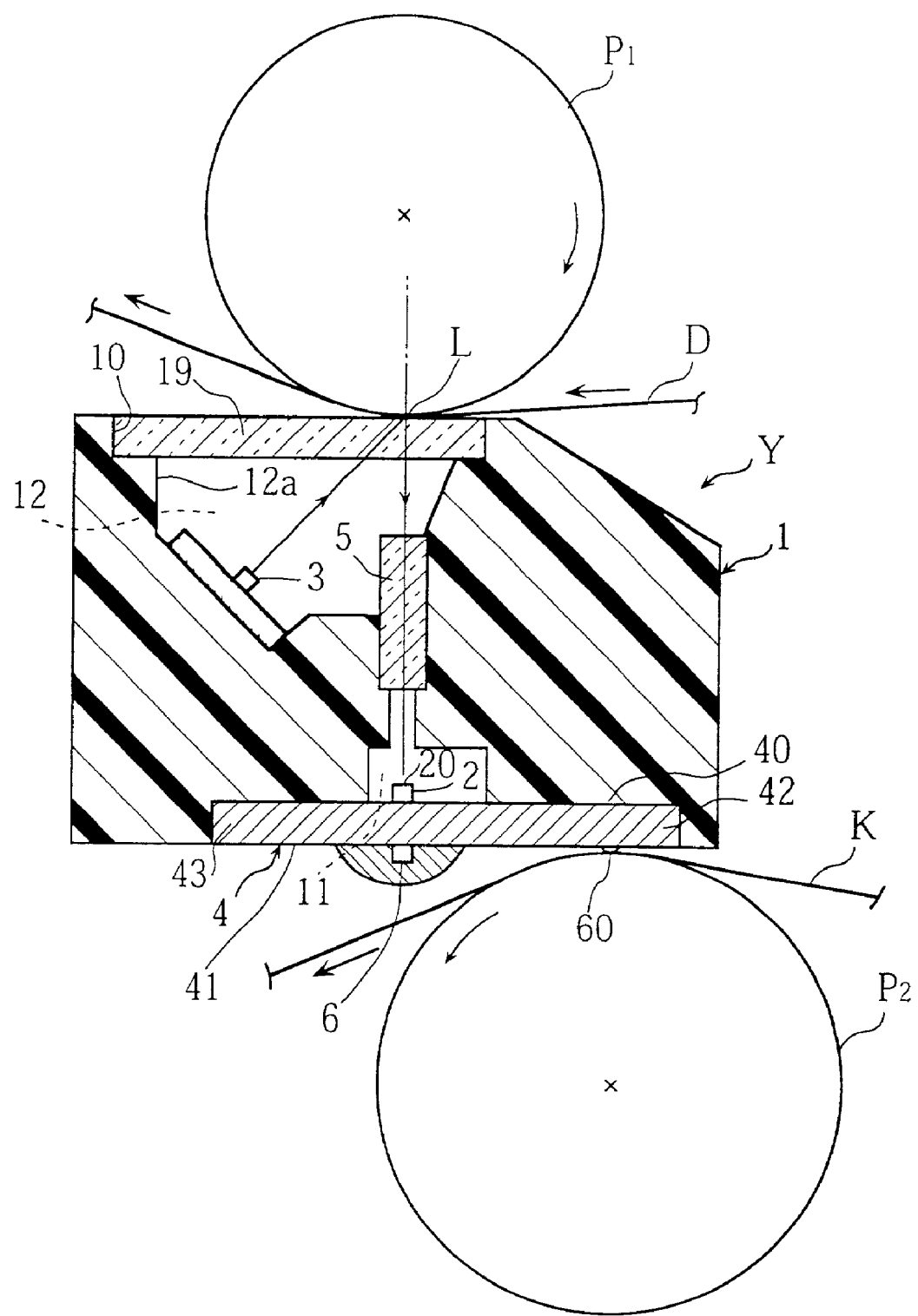
FIG. 16 is a sectional view of a prior art integrated image reading/writing head.
Figure 17:
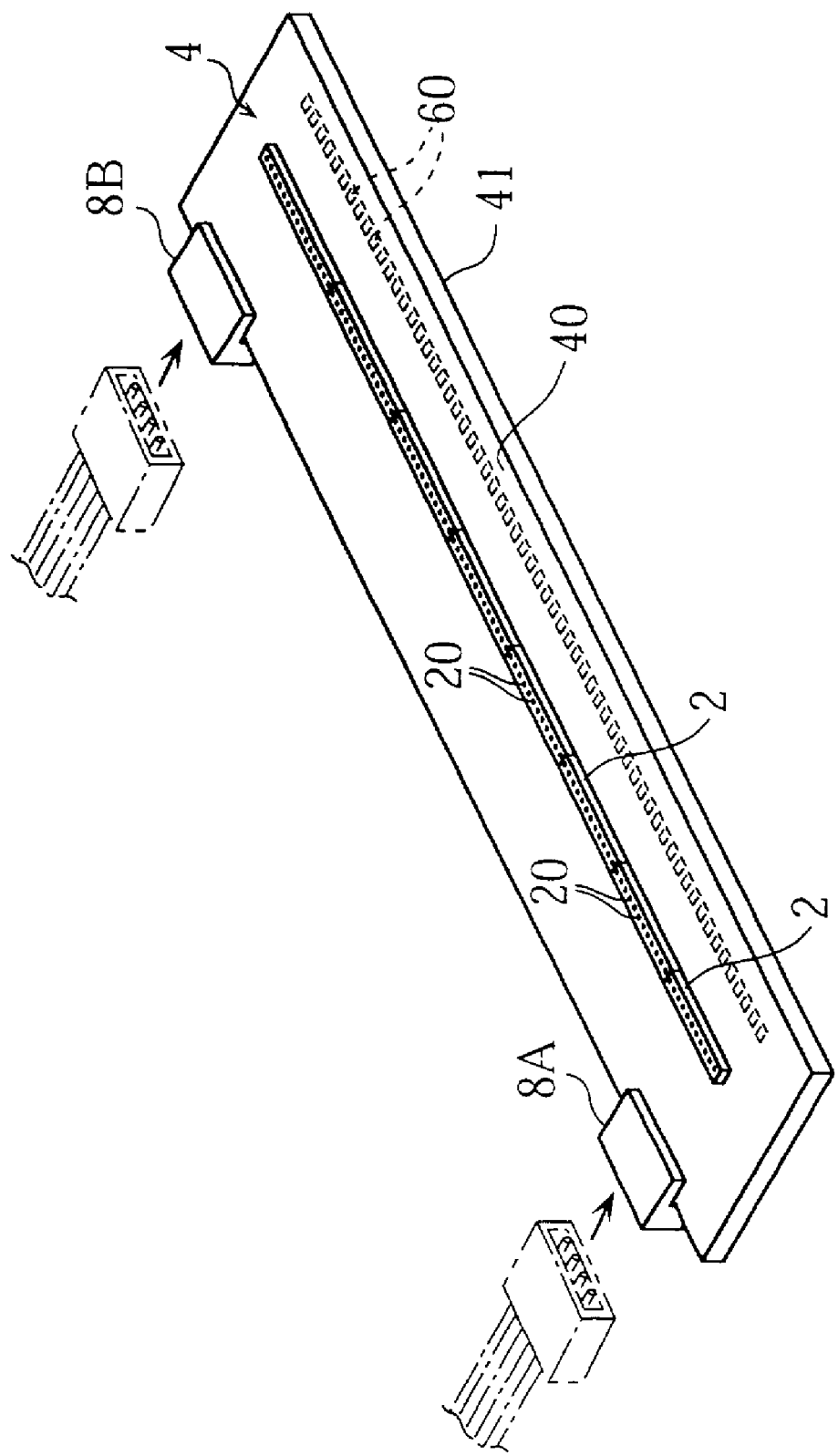
FIG. 17 is a perspective view showing a substrate and connectors of the integrated image reading/writing head in FIG. 16.

The image processing apparatus 9 shown in the figure comprises a box 90 in which the integrated image reading/writing head X is incorporated. The platen roller $P_1$ for feeding the document D is faced to the transparent cover 19. The platen roller $P_2$ for unwinding a roll R and feeding the recording paper K is faced to the heating elements 60. According to the image processing apparatus 9, differing from the prior art integrated image reading/writing head Y described earlier with reference to FIG. 16, the platen rollers $P_1$, $P_2$ do not sandwich the case 1 thickness-wise, and the platen roller $P_2$ overlaps the case 1 height-wise of the image processing apparatus 9. Therefore, the thickness of the image processing apparatus 9 can be decreased than in the prior art.

The image processing apparatus 9 provides both the image reading function and image printing function. For example, reading of an image of the document D is made as follows. Specifically, the document D as the object of reading is put into a document feeding port 91a formed in an upper surface 91 of the box 90 and guided between the platen roller $P_1$ and the transparent cover 19. The document D is then fed while being tightly contacted to the transparent cover 19 by rotation of the platen roller $P_1$. During the feeding, the reading line L in the document D is illuminated by the light from the light sources 3. The light reflected by the document D is focused by the lens array 5, and an image on the document D is created on the light receiving elements 20 provided by the sensor IC chips 2. The reading circuit provided by the sensor IC chips 2 outputs an image signal of a level corresponding to an amount of light received by each of the light receiving elements, representing a line of the image. The signal is taken out of the integrated image reading/writing head X via the connector 8. The document D is fed by the platen roller $P_1$ in a direction of arrows in the figure, line by line, and the above described reading sequence is repeated, eventually capturing the entire image of the document D. After the reading is complete, the document D is discharged from a discharge port 92a formed in a front surface 92 of the box 90.

On the other hand, when recording on the recording paper K, the paper K is held and fed between the platen roller $P_2$ and the heating elements 60. During the feeding, each of the drive IC chips 6 selectively drives the heating elements 60, printing a line of the image to the recording paper K. After the printing is complete, the recording paper K is discharged from a discharge port 93a formed in a back surface 93 of the box 90.

Figure 12:
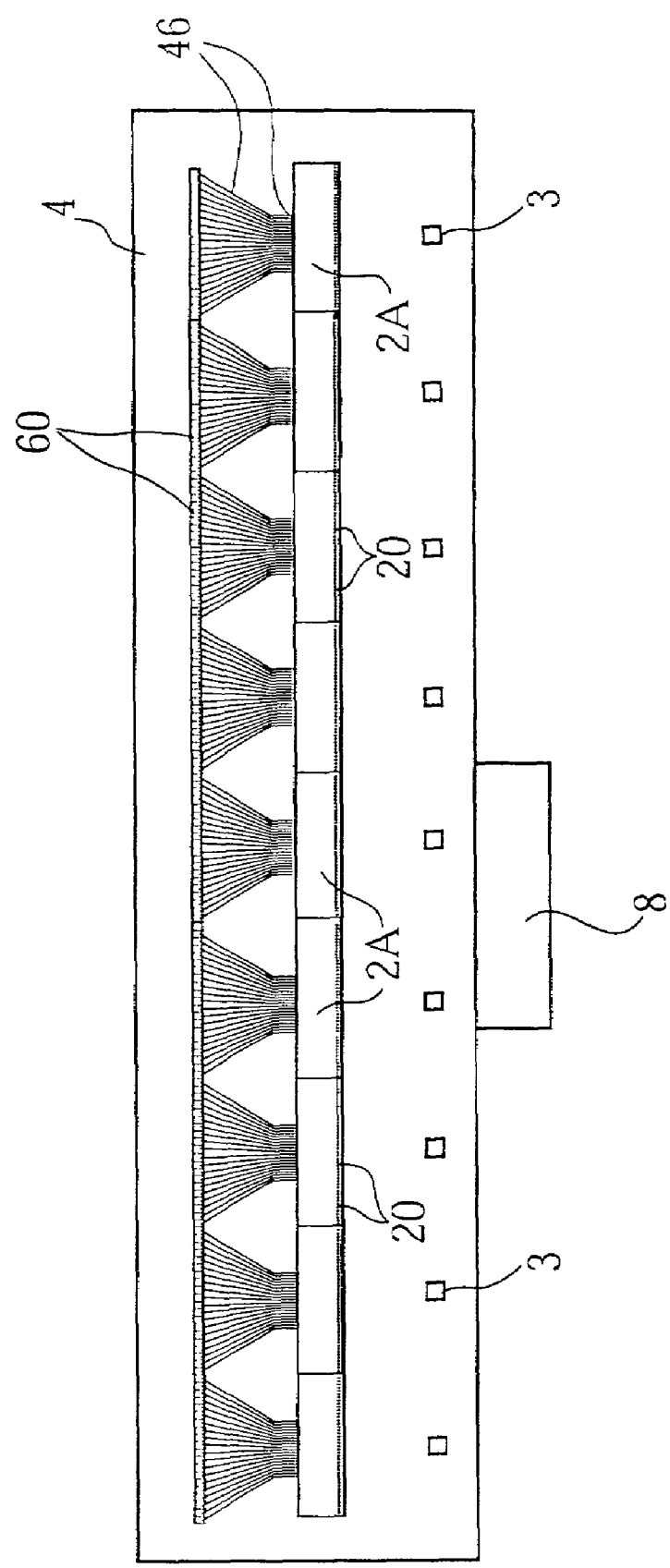
FIG. 12 is a plan view showing a principal portion of an integrated image reading/writing head as a second embodiment of the present invention.
Figure 13:
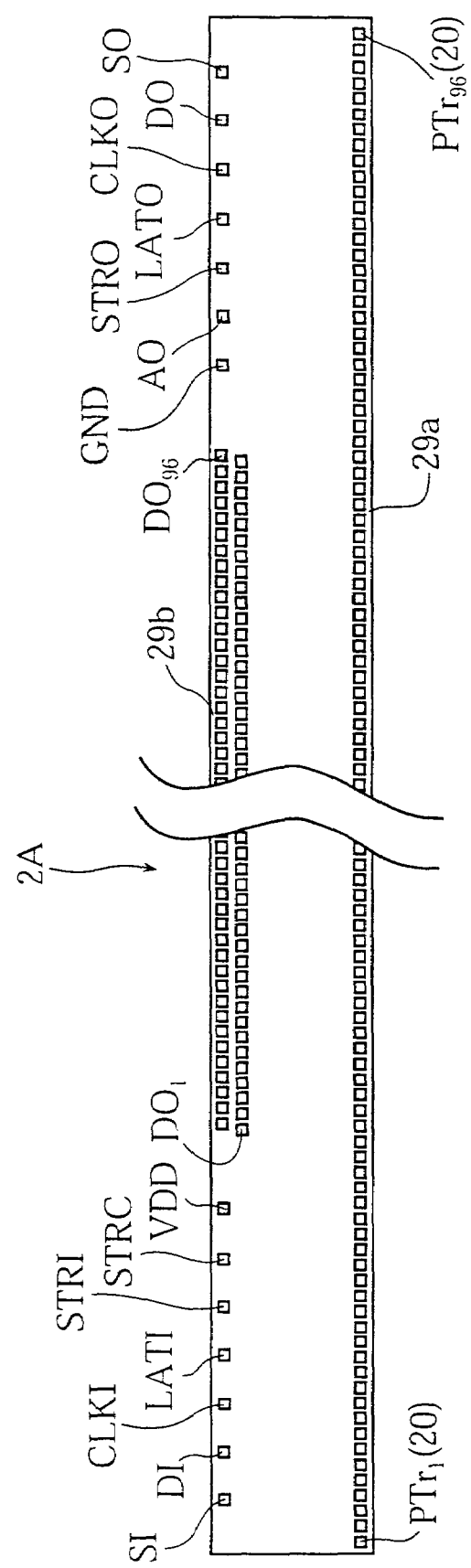
FIG. 13 is an enlarged plan view showing another example of the IC chip.
Figure 14:
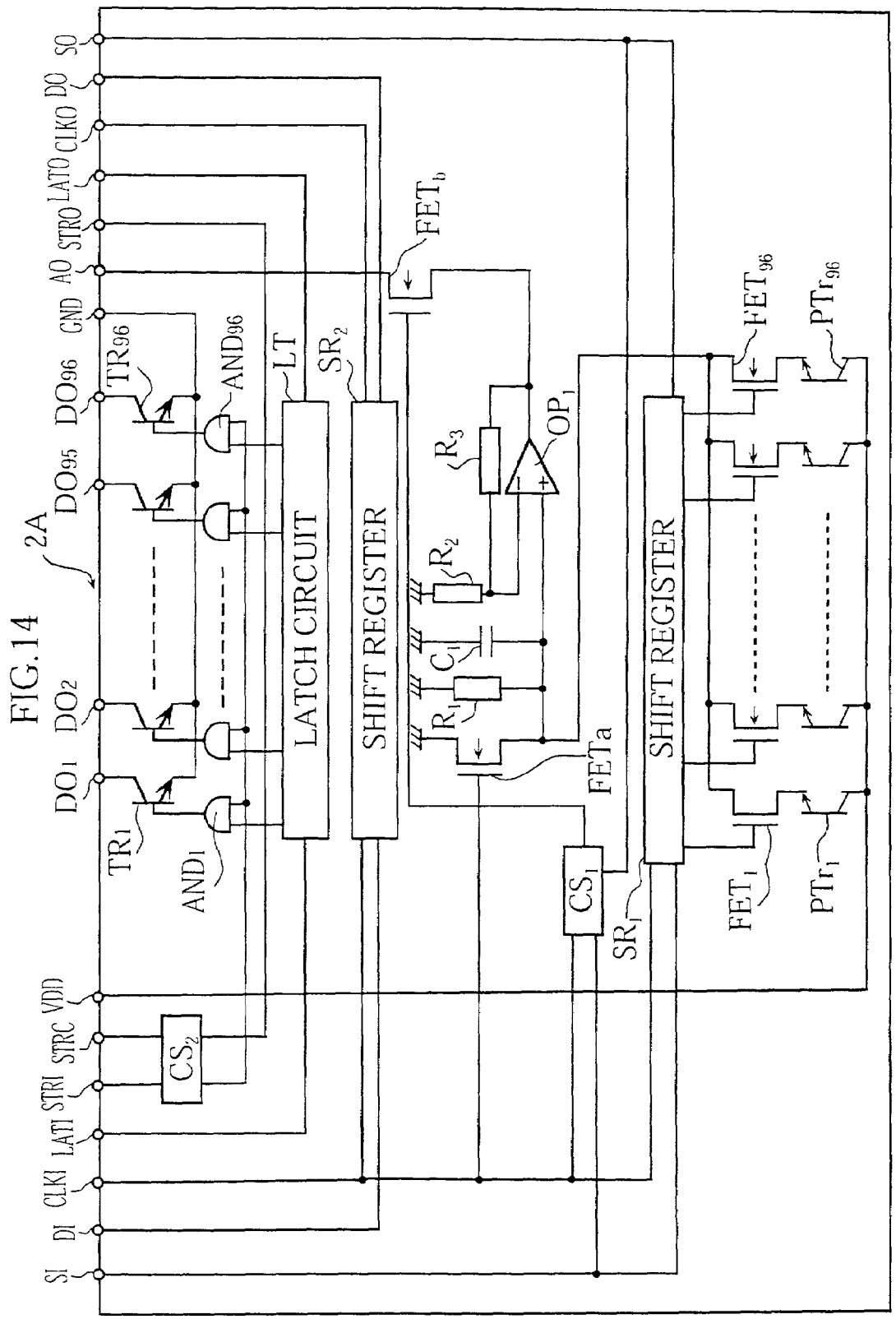
FIG. 14 is a block diagram of a circuit inside the IC chip in FIG. 13.

FIG. 12–FIG. 14 show a second embodiment of the present invention. It should be noted here however, that in FIG. 12 and thereafter, elements same as or similar to those in the first embodiment are indicated by the same alphanumeral codes.

According to the arrangement shown in FIG. 12, a plurality of IC chips 2A are mounted in a row on the upper surface of the substrate 4. In each of the IC chips 2A, the circuit built in the sensor IC chip 2 and the circuit built in the drive IC chip 6 described in the first embodiment are incorporated within a single chip.

Each of the IC chips 2A has an internal circuit as shown in FIG. 14. As is clear from comparison between the circuit shown in the figure and the circuits shown in FIG. 9 and FIG. 10, the circuit shown in FIG. 14 is an integration of the reading circuit shown in FIG. 9 and the writing circuit shown in FIG. 10. However, in the circuit in each of the IC chips 2A, the number of phototransistors $PTr_1$~$PTr_{96}$ as the light receiving elements is made the same as the number of the bipolar transistors $TR_1$~$TR_{96}$. Thus, the number of pixels read and the number of dots printed by one IC chip 2A are the same. Each of the sensor IC chips 2 includes 96 phototransistors $PTr_1$~$PTr_{96}$, 96 field effect transistors $FET_1$~$FET_{96}$, a transistor $SR_1$ for light reception, a chip selection circuits $CS_1$, $CS_2$, an operational amplifier $OP_1$, field effect transistors $FET_a$, $FET_b$, a capacitor $C_1$, resistors $R_1$~$R_3$, a shift resistor $R_2$ for heating, a latch circuit LT, a plurality, e.g. 96, of AND circuits $AND_1$~$AND_{96}$, 96 bipolar transistors $TR_1$~$TR_{96}$, and pads SI, TI, CLKI, LATI, STRI, STRC, VDD, $DO_1$, $DO_{96}$, GND, AO, STRO, LATO, CLKO, DO, and SO. The phototransistors $PTr_1$ $PTr_{96}$ provide light receiving elements which output read image signal corresponding to the image on the document D upon reception of the light reflected on the document D. The bipolar transistors $TR_1$~$TR_{96}$ provides switches for applying electric current to the light receiving elements 9 The field effect transistors $FET_1$~$FET_{96}$, the shift register $SR_1$, the chip selection circuit $CS_1$, the operational amplifier $OP_1$, the field effect transistors $FET_a$, $FET_b$, the capacitor $C_1$, and resistors $R_1$~$R_3$ provide a light receiving elements controlling circuit for sequentially taking out the output from the phototransistors $PTr_1$~$PTr_{96}$. The shift register $SR_1$, the latch circuit LT, the chip selection circuit $CS_2$, the AND circuits $AND_1$~$AND_{96}$, and the bipolar transistors $TR_1$~$TR_{96}$ provide a circuit selectively applying electricity to the heating elements 60 in accordance with the record image.

As clearly shown in FIG. 13, each of the IC chips 2A has an upper surface including a first edge portion 29a formed with an array of the phototransistors $PTr_1$~$PTr_{96}$ which provide the light receiving elements. Further, all of the pads SI, TI, CLKI, LATI, STRI, STRC, VDD, $DO_1$~$DO_{96}$, GND, AO, STRO, LATO, CLKO, DO, and SO are formed on a second edge portion 29b. The pads $DO_1$~$DO_{96}$ for the electrodes are disposed in two lines, with the length of each line being shorter than the length of the array of the phototransistors $PTr_1$~$PTr_{96}$. With this arrangement, there is provided a space not occupied by the pads $DO_1$~$DO_{96}$ at each longitudinal end portion of the second edge portion 29b. The pads other than the electrode pads $DO_1$~$DO_{96}$ are disposed in these spaces in the second edge portion 29b.

According to the above arrangement, when each of the pads on the IC chip 2A is connected with the wiring pattern via a wire, the wire can be prevented from covering the phototransistors $PTr_1$~$PTr_{96}$. Therefore, it becomes possible to prevent the wire from blocking the light to the phototransistors $PTr_1$~$PTr_{96}$. Further, since the signal input/output pads are disposed at a longitudinally end portion of the IC chip 2A, wiring operation for signal forwarding function between two adjacent IC chips 2A becomes easy.

According to the present invention, if the above described IC chip 2A are utilized, the total number of IC chips mounted on the substrate 4 can be decreased. Therefore, it becomes possible to decrease the number of steps necessary for mounting the IC chips on the substrate 4, and to further increase the productivity in the manufacture of the integrated image reading/writing head.

Figure 15:
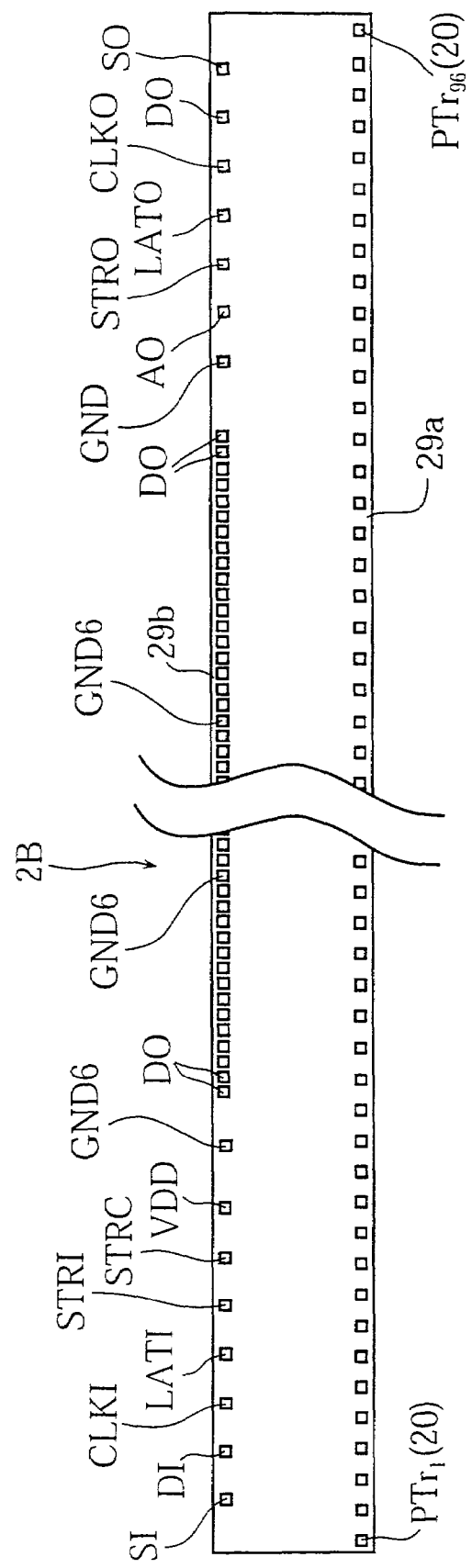
FIG. 15 is an enlarged plan view of the IC chip according to a third embodiment of the present invention.

FIG. 15 shows a third embodiment of the present invention. An IC chip 2B shown in this figure is, as in the IC chips 2A shown in FIG. 13, an integration of the reading circuit and the writing circuit into a single chip. However, the electrode pads DO is disposed in a single row, yet disposed at a pitch smaller than the pitch between the phototransistors $PTr_1$~$PTr_{96}$, and therefore in a shorter length than the length of the array of the phototransistors $PTr_1$~$PTr_{96}$. With this arrangement, there is provided a space not occupied by the pads $DO_1$~$DO_{96}$ at each longitudinal end portion of the second edge portion 29b of the IC chip 2B. The pads other than the electrode pads $DO_1$~$DO_{96}$ are disposed in these spaces. Further, within the array of the electrode pads $DO_1$~$DO_{96}$, a plurality of grounding pads GND6 are disposed.

With such an arrangement as above, the same effect as achieved in the IC chips 2A shown in FIG. 13 can be obtained. However, the wire bonding operation to the electrode pads DO becomes easier to the extent that these pads are disposed in a single row. Further, by using the grounding pads GND6, the grounding connection can be made at a plurality of location in a single IC chip 2B. Therefore, it also becomes possible to increase the number of grounding connections to the heating elements 6, thereby stabilizing the electric potential of the grounding, and improve the quality of the print image.

Specific arrangements in the image processing apparatus according to the present invention are not limited to those described in the embodiment and can be varied in many ways. For example, as the light source, the LED may be substituted by a cold cathode tube.

What is claimed is:

1. An integrated image reading/writing head comprising:
   a substrate provided with a reading circuit including a plurality of light receiving elements disposed in a row;
   a case assembled to the substrate and enclosing the light receiving elements;
   a transparent cover attached to the case, the transparent cover being spaced from and opposed to the substrate for contact with a document being fed;
   a light source disposed within the case for illuminating the document;
   a plurality of lenses disposed within the case for focusing an image of the document illuminated by the light source on the light receiving elements;
   a plurality of printing elements mounted on the substrate in a row parallel to the row of light receiving elements; and
   a writing circuit provided on the substrate for controlling the printing elements;
   wherein the reading circuit, the printing elements and the writing circuit are provided on a same surface of the substrate;
   wherein the substrate is provided with one connector electrically connected with each of the reading circuit, the printing elements and the writing circuit;
   wherein the substrate has an elongate edge extending in a predetermined direction;
   wherein the connector is attached to a longitudinal center portion of the elongate edge;
   wherein the surface of the substrate is provided with a common electrode wiring and a common grounding wiring capable of supplying electric power to the printing elements, each of the common electrode wiring and the common grounding wiring having a straight portion extending longitudinally of the substrate, the straight portions of both wirings sandwiching the printing elements;
   wherein one of the straight portions having two longitudinal ends connected with the connector; and
   wherein the other of the straight portions having a longitudinal center portion connected with the connector.

2. The integrated image reading/writing head according to claim 1, wherein the substrate has a first elongate edge and a second elongate edge each extending in said predetermined direction, the first elongate edge extending beyond the case, the printing elements being mounted on the first elongate edge outside the case.

3. The integrated image reading/writing head according to claim 2, wherein the connector is attached to the second elongate edge of the substrate.

4. The integrated image reading/writing head according to claim 1, wherein the reading circuit comprises a plurality of sensor IC chips each incorporating an integrated circuit as a unit of the reading circuit, the writing circuit comprising a plurality of drive IC chips each incorporating an integrated circuit as a unit of the writing circuit.

5. The integrated image reading/writing head according to claim 1, wherein the reading circuit and the writing circuit commonly comprise a plurality of IC chips each incorporating an integrated circuit as a unit of the reading and writing circuits.

6. The integrated image reading/writing head according to claim 5, wherein each of the IC chips is oblong rectangular, having a first edge portion and a second edge portion each extending in a predetermined direction, the first edge portion of the IC chip carrying the row of light receiving elements, the second edge portion being provided with a plurality of electrode pads for connection with the printing elements.

7. The integrated image reading/writing head according to claim 6, wherein the electrode pads are disposed in a row shorter than the row of the light receiving elements, the second edge portion of each IC chip having two longitudinal edge portions provided with a plurality of signal pads for signal inputting and outputting, sandwiching the electrode pads.

8. The integrated image reading/writing head according to claim 7, wherein the second edge portion of each IC chip is further provided with a plurality of grounding pads.

9. The integrated image reading/writing head according to claim 1, wherein the printing elements are heating elements.

10. The integrated image reading/writing head according to claim 1, wherein the light source is disposed on said surface of the substrate.

11. The integrated image reading/writing head according to claim 10, wherein the light source is electrically connected with the connector.

12. An image processing apparatus comprising an integrated image reading/writing head,
    the integrated image reading/writing head including:
    a substrate provided with a reading circuit including a plurality of light receiving elements disposed in a row;
    a case assembled to the substrate and enclosing the light receiving elements;
    a transparent cover attached to the case, the transparent cover being spaced from and opposed to the substrate for contact with a document being fed;
    a light source disposed within the case for illuminating the document;
    a plurality of lenses disposed within the case for focusing an image of the document illuminated by the light source on the light receiving elements;
    a plurality of printing elements mounted on the substrate in a row parallel to the row of light receiving elements; and
    a writing circuit provided in on the substrate for controlling the printing elements;
    wherein the reading circuit, the printing elements and the writing circuit are provided on a same surface of the substrate;
    wherein the substrate is provided with one connector electrically connected with each of the reading circuit, the printing elements and the writing circuits;
    wherein the substrate has an elongate edge extending in a predetermined direction;
    wherein the connector is attached to a longitudinal center portion of the elongate edge;
    wherein the surface of the substrate is provided with a common electrode wiring and a common grounding wiring capable of supplying electric power to the printing elements, each of the common electrode wiring and the common grounding wiring having a straight portion extending longitudinally of the substrate, the straight portions of both wirings sandwiching the printing elements:

wherein one of the straight portions having two longitudinal ends connected with the connector; and wherein the other of the straight portions having a longitudinal center portion connected with the connector.

13. An integrated image reading/writing head comprising:

a substrate provided with a reading circuit including a plurality of light receiving elements disposed in a row;

a case assembled to the substrate and enclosing the light receiving elements;

a transparent cover attached to the case, the transparent cover being spaced from and opposed to the substrate for contact with a document being fed;

a light source disposed within the case for illuminating the document;

a plurality of lenses disposed within the case for focusing an image of the document illuminated by the light source on the light receiving elements;

a plurality of printing elements mounted on the substrate in a row parallel to the row of light receiving elements; and a writing circuit provided on the substrate for controlling the printing elements;

wherein the reading circuit, the printing elements and the writing circuit are provided on a same surface of the substrate;

wherein the reading circuit and the writing circuit commonly comprise a plurality of IC chips each incorporating an integrated circuit as a unit of the reading and writing circuits;

wherein each of the IC chips is oblong rectangular, having a first edge portion and a second edge portion each extending in a predetermined direction, the first edge portion of the IC chip carrying the row of light receiving elements, the second edge portion being provided with a plurality of electrode pads for connection with the printing elements; and wherein the electrode pads are disposed in a row shorter than the row of the light receiving elements, the second edge portion of each IC chip having two longitudinal edge portions provided with a plurality of signal pads for signal inputting and outputting, sandwiching the electrode pads.

14. The integrated image reading/writing head according to claim 13, wherein the second edge portion of each IC chip is further provided with a plurality of grounding pads.

* * * * *